US010635975B2

(12) United States Patent
Umeda

(10) Patent No.: US 10,635,975 B2
(45) Date of Patent: Apr. 28, 2020

(54) METHOD AND APPARATUS FOR MACHINE LEARNING

(71) Applicant: FUJITSU LIMITED, Kawasaki-shi, Kanagawa (JP)

(72) Inventor: Yuhei Umeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 652 days.

(21) Appl. No.: 15/383,195

(22) Filed: Dec. 19, 2016

(65) Prior Publication Data

US 2017/0206450 A1 Jul. 20, 2017

(30) Foreign Application Priority Data

Jan. 18, 2016 (JP) .................................. 2016-006808

(51) Int. Cl.
*G06N 3/08* (2006.01)
*G06N 3/04* (2006.01)

(52) U.S. Cl.
CPC ................. *G06N 3/08* (2013.01); *G06N 3/04* (2013.01); *G06N 3/0454* (2013.01); *G06N 3/084* (2013.01)

(58) Field of Classification Search
CPC ............ G06N 3/08; G06N 3/084; G06N 3/04; G06N 3/0454
See application file for complete search history.

(56) References Cited

U.S. PATENT DOCUMENTS

| 2014/0180986 | A1 | 6/2014 | Hinton et al. |
| 2014/0180989 | A1 | 6/2014 | Krizhevsky et al. |
| 2016/0162781 | A1* | 6/2016 | Lillicrap .............. G06N 3/0454 706/25 |
| 2016/0307098 | A1* | 10/2016 | Goel ...................... G06N 3/082 |

OTHER PUBLICATIONS

Hinton G. E., Srivastava N., Krizhevsky A., Sutskever I. and Salakhutdinov R. R., "Improving neural networks by preventing co-adaptation of feature detectors", [online], Jul. 3, 2012, University of Toronto, Internet (Year: 2012).*
Nitish Srivastava, Geoffrey Hinton, Alex Krizhevsky, Ilya Sutskever, "Dropout: A Simple Way to Prevent Neural Networks from Overtting", Journal of Machine Learning Research 15 (2014), pp. 1929-1958 (Year: 2014).*
Yoon Kim, "Convolutional Neural Networks for Sentence Classification", [online], Sep. 3, 2014, New York University, Internet (Year: 2014).*
Natalia Neverova, Christian Wolf, Graham Taylor and Florian Nebout, "ModDrop: adaptive multi-modal gesture recognition", [online], Jun. 6, 2015 (Year: 2015).*

(Continued)

*Primary Examiner* — Paulinho E Smith
(74) *Attorney, Agent, or Firm* — Fujitsu Patent Center

(57) ABSTRACT

A disclosed machine learning method includes: calculating a first output error between a label and an output in a case where dropout in which values are replaced with 0 is executed for a last layer of a first channel among plural channels in a parallel neural network; calculating a second output error between the label and an output in a case where the dropout is not executed for the last layer of the first channel; and identifying at least one channel from the plural channels based on a difference between the first output error and the second output error to update parameters of the identified channel.

12 Claims, 27 Drawing Sheets

(56) References Cited

OTHER PUBLICATIONS

Natalia Neverova et al., "ModDrop: adaptive multi-modal gesture recognition", [online], Jun. 6, 2015, Cornell University Library, [retrieved on Jan. 12, 2016], Internet (Total 14 pages).
Yi Zheng et al., "Time Series Classification Using Multi-Channels Deep Convolutional Neural Networks", WAIM 2014, Lecture Notes in Computer Science 8485, pp. 298-310, 2014 (Total 13 pages).

* cited by examiner

○ : NODE WHOSE VALUE HAS BEEN REPLACED WITH RANDOM VALUE

——— : EDGE FOR WHICH LEARNING IS EXECUTED

——— : EDGE FOR WHICH LEARNING IS EXECUTED

BACKPROPAGATION

|  | WITHOUT BLOCK DROPOUT | CONVENTIONAL BLOCK DROPOUT | BLOCK DROPOUT IN THIS EMBODIMENT |
|---|---|---|---|
| WITHOUT BACK DROPOUT | 64.4% | 66.7% | 68.9% |
| BACK DROPOUT IN THIS EMBODIMENT | 66.7% | 66.7% | 71.1% (THIS EMBODIMENT) |

FIG.26

METHOD AND APPARATUS FOR MACHINE LEARNING

CROSS-REFERENCE TO RELATED APPLICATIONS

This application is based upon and claims the benefit of priority of the prior Japanese Patent Application No. 2016-006808, filed on Jan. 18, 2016, the entire contents of which are incorporated herein by reference.

FIELD

This invention relates to machine learning.

BACKGROUND

In recent years, multilayer neural networks (also called DNN (Deep Neural Networks)) are used in data classification. For example, particularly, a CNN (Convolutional Neural Network) which is one kind of a DNN is often used in classification of one-dimensional time-series data and two-dimensional image data. FIG. 1 illustrates an example of a CNN. In FIG. 1, the round graphic shapes represent nodes, and the line segments that connect between nodes represent edges. As illustrated in FIG. 1, in a CNN, convolutional layers and pooling layers are provided between an input layer and an output layer. In convolutional layers and pooling layers, features are extracted from data, and classification is performed based on the extracted features.

There are not only CNNs with a single input but also CNNs with plural inputs. For example, there are cases in which classification of meteorological conditions is performed according to data obtained from cameras located at plural observation points, cases in which behavior estimation is performed according to data that is obtained from wearable sensors attached to both hands and both feet, and the like. FIG. 2 illustrates an example of a CNN that processes plural inputs. In the CNN that is illustrated in FIG. 2, nodes that correspond to each input are in the input layer, and it is possible to process plural inputs.

However, in this CNN, features are not extracted from each of plural inputs, but a feature is extracted from the combination of plural inputs. Generally, each image and each time series have its own independent meaning, and it is often preferable to extract a feature from each image and each time series. Moreover, there is a case in which it is not possible to simply join data from plural inputs, and a case in which it is not possible to join data in and after the second layer because network structures to be applied differ. The former case is a case where a CNN cannot be applied because joined data does not become rectangular data because, for example, data sizes of plural images are different. The latter case is a case where both image data and time-series data are processed, and a case where both image data and language data are processed.

On the other hand, in a parallel CNN such as illustrated in FIG. 3, it is possible to extract a feature from each input. In FIG. 3, a channel is provided for each input, and a network structure of a channel is suitable to that input. A feature is extracted from an input of each channel, and the features are combined in the last stage.

However, strength of an effect that an input has on an output may differ depending on a type of an image and a time series, and there may be no effect at all on a certain output depending on a type of an image and a time series. When performing learning using a typical backpropagation, an effect that errors have is uniformly distributed among channels, and it is not possible to perform learning that takes strength of an effect of each input into consideration. Moreover, even when there are an output that an input affects and an output that an input does not affect, it is not possible to perform learning that takes that into consideration. Proper learning is not performed due to the reason described above, and there is a case where precision of classification is not improved as a result.

Patent Document 1: U.S. Patent Publication No. 2014/0180989

Non-Patent Document 1: Natalia Neverova, Christian Wolf, Graham Taylor, and Florian Nebout, "ModDrop: adaptive multi-modal gesture recognition", [online], Jun. 6, 2015, Cornell University Library, [retrieved on Jan. 12, 2016], Internet Non-Patent Document 2: Yi Zheng, Qi Liu, Enhong Chen, Yong Ge, and J. Leon Zhao, "Time Series Classification Using Multi-Channels Deep Convolutional Neural Networks", WAIM2014, Lecture Notes in Computer Science 8485, pp. 298-310, 2014

In other words, there is no technique to improve precision of classification by a parallel neural network.

SUMMARY

A machine learning method relating to one aspect includes: calculating a first output error between a label and an output in a case where dropout in which values are replaced with 0 is executed for a last layer of a first channel among plural channels in a parallel neural network; calculating a second output error between the label and an output in a case where the dropout is not executed for the first channel; and identifying at least one channel from the plural channels based on a difference between the first output error and the second output error to update parameters of the identified channel.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 26 is a diagram to explain improvements of precision of classification;

DESCRIPTION OF EMBODIMENTS

Embodiment 1

Figure 1:
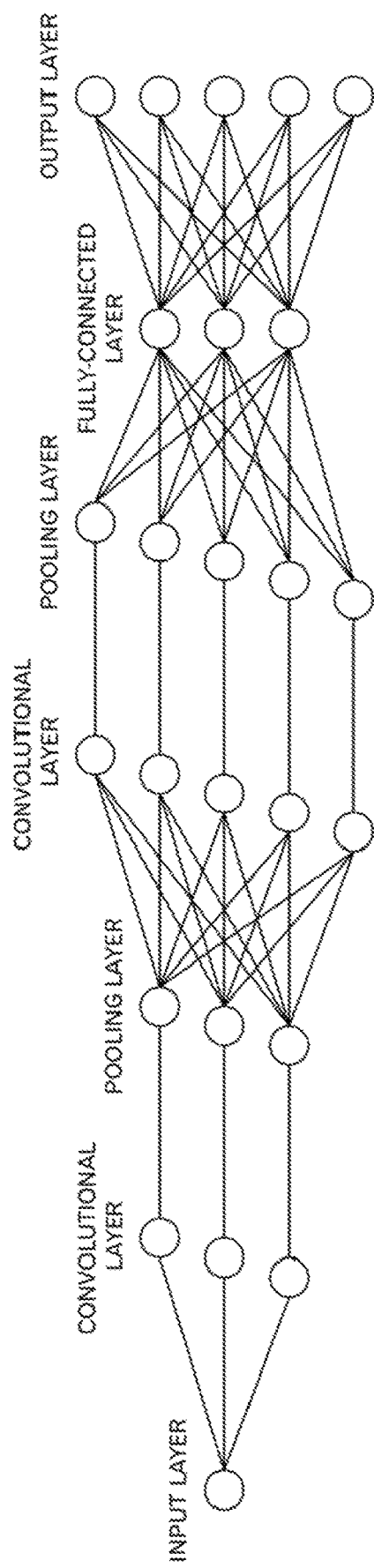
FIG. 1 is a diagram depicting an example of a CNN.
Figure 2:
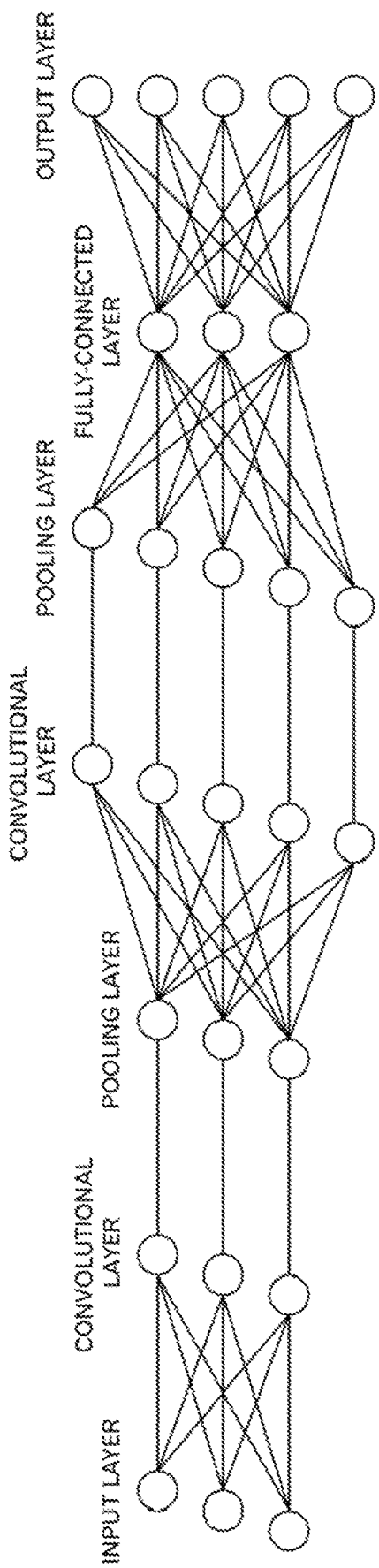
FIG. 2 is a diagram depicting an example of a CNN that processes plural inputs.
Figure 3:
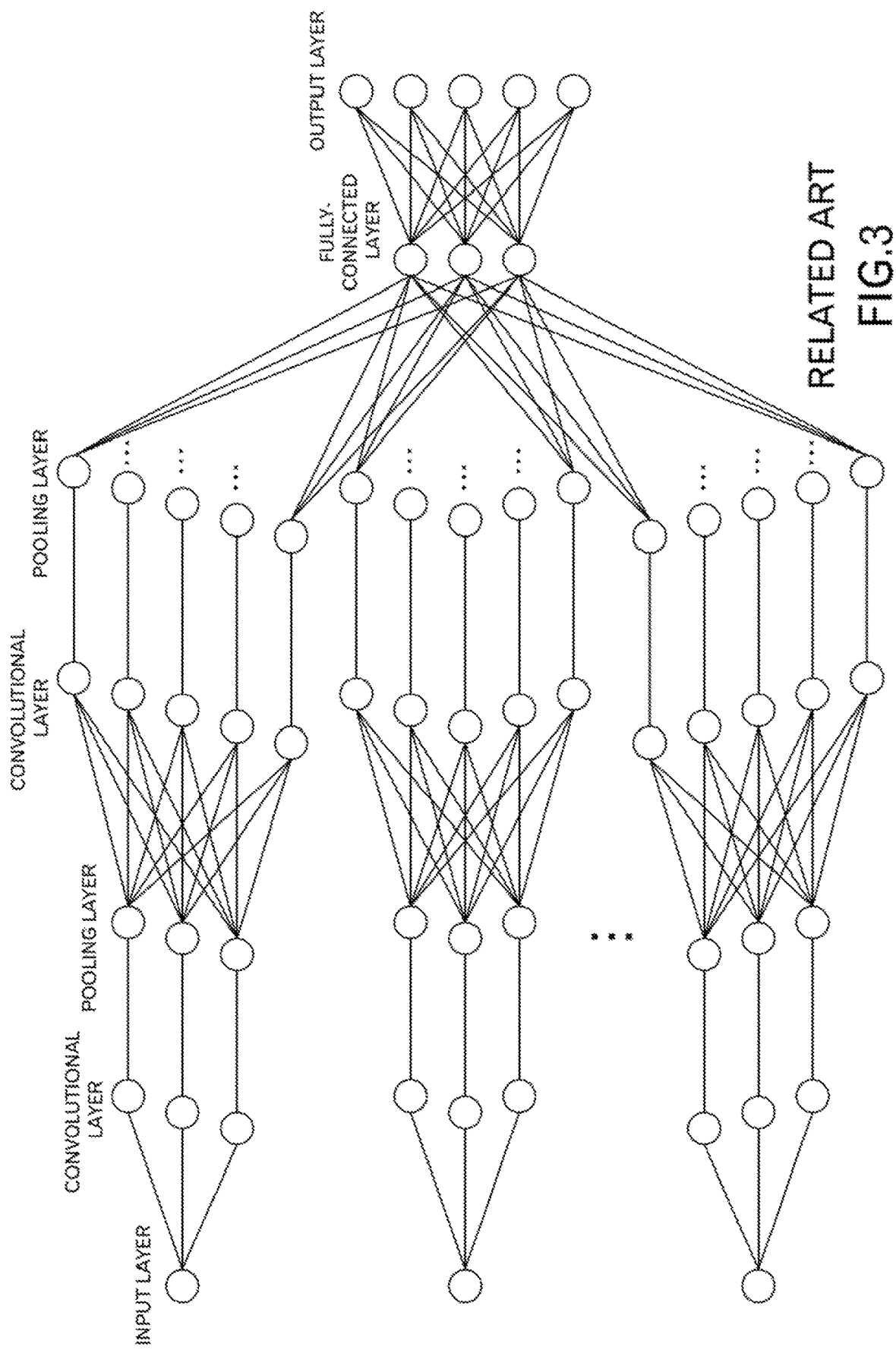
FIG. 3 is a diagram depicting an example of a parallel CNN.
Figure 4:
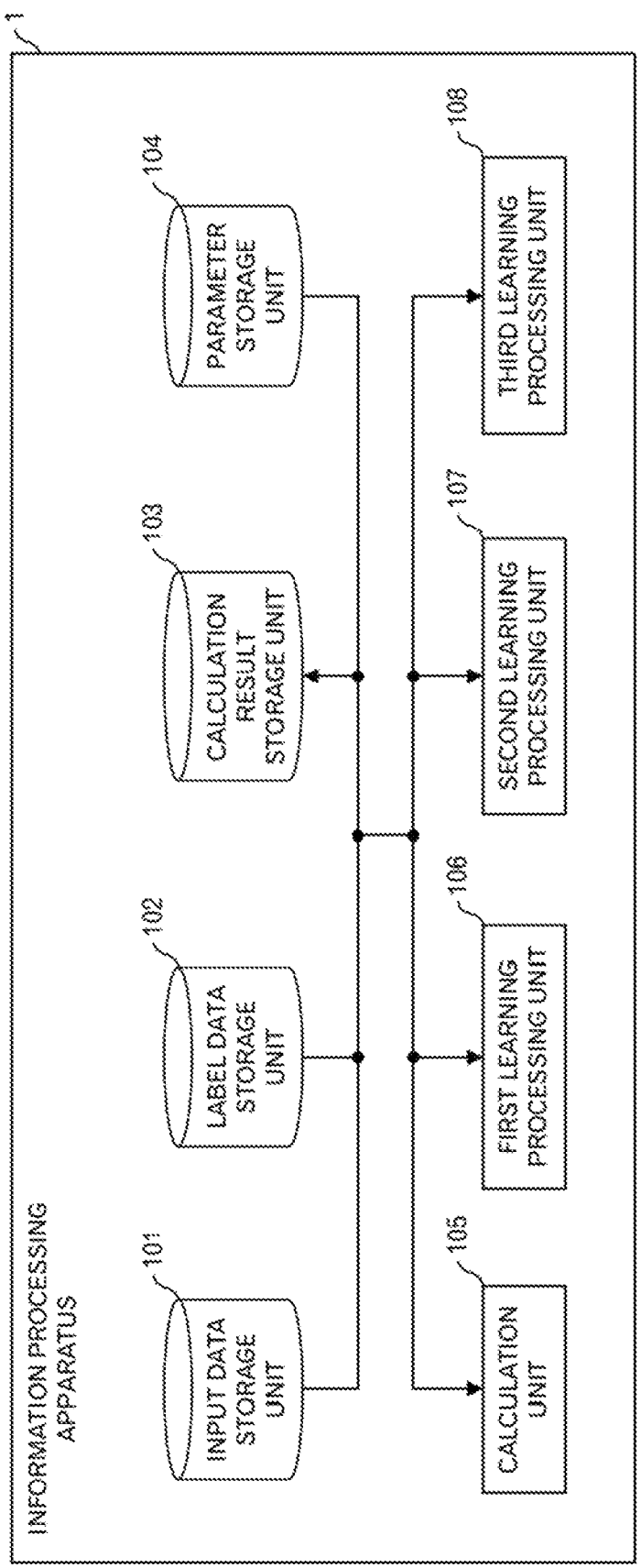
FIG. 4 is a functional block diagram of an information processing apparatus of this embodiment.

FIG. 4 illustrates a functional block diagram of an information processing apparatus 1 of a first embodiment. The information processing apparatus 1 includes an input data storage unit 101, a label data storage unit 102, a calculation result storage unit 103, a parameter storage unit 104, a calculation unit 105, a first learning processing unit 106, a second learning processing unit 107 and a third learning processing unit 108.

The input data storage unit 101 stores input data (or in other words, a vector of an input layer) that is an input for a DNN of this embodiment. The input data is, for example, sensor data that is obtained by physical sensors, and image data or the like that is obtained by physical devices such as a digital camera and smartphone. Physical sensors are, for example, wearable sensors that are attached to a human body, weather observation sensors that are located outdoors, and the like. There are plural inputs for a DNN in this embodiment, and the input data storage unit 101 stores data of plural inputs. The label data storage unit 102 stores labels (also called teacher data) that represent correct answers for the input data. The calculation result storage unit 103 stores results of calculation by the calculation unit 105 (for example, output data, values for each node, and the like). The parameter storage unit 104 stores parameters of the DNN (for example, weight matrices).

The calculation unit 105 executes processing for calculating output data (in other words, a vector of an output layer) according to the DNN based on the input data that was stored in the input data storage unit 101 and the parameters that was stored in the parameter storage unit 104, and stores calculation results in the calculation result storage unit 103. The first learning processing unit 106 executes processing for updating the parameters that are stored in the parameter storage unit 104 based on data that is stored in the calculation result storage unit 103. The second learning processing unit 107 executes processing for updating the parameters that are stored in the parameter storage unit 104 based on data that is stored in the calculation result storage unit 103. The third learning processing unit 108 executes processing for updating the parameters that are stored in the parameter storage unit 104 based on data that is stored in the calculation result storage unit 103.

Figure 5:
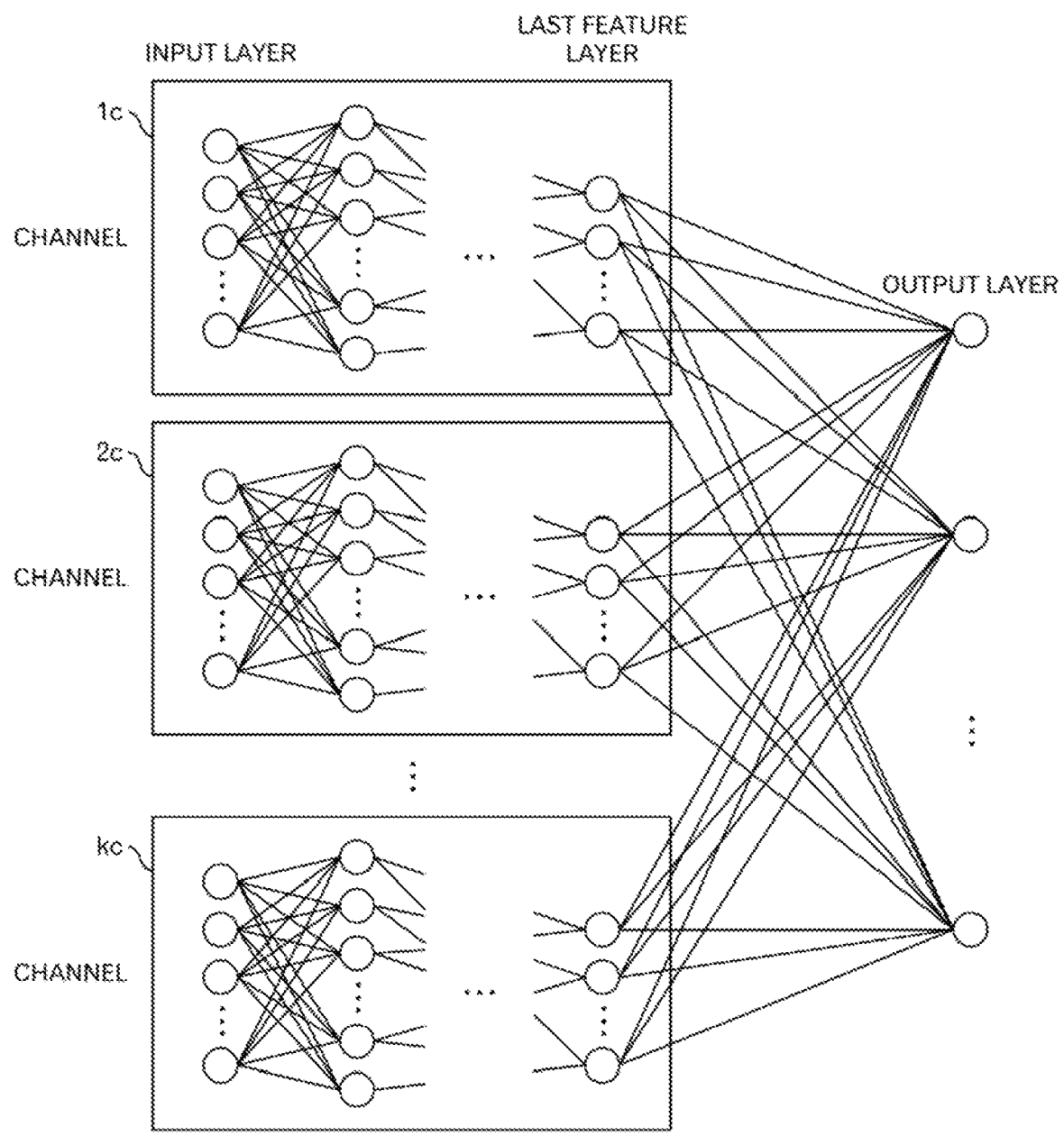
FIG. 5 is a diagram depicting an example of a DNN of this embodiment.

FIG. 5 illustrates an example of a DNN of this embodiment. As illustrated in FIG. 5, the DNN of this embodiment has channels $1c$ to $kc$ (k is a natural number that is 2 or greater). In each channel, calculation is performed according to a multilayer neural network having a structure that is suited for processing of input data of that channel. Each node of the last feature layer of each channel is connected to each node of the output layer.

Processing of this embodiment may be applied to not only a CNN but also all kinds of DNNs. Moreover, structures of channels may be different, such as channel $1c$ being a 2-dimensional CNN for images, channel $2c$ being a 1-dimensional CNN for time series, . . . , and channel $kc$ being a simple DNN for natural languages.

Next, operation of the information processing apparatus 1 of this first embodiment will be explained using FIG. 6 to FIG. 26.

Figure 6:
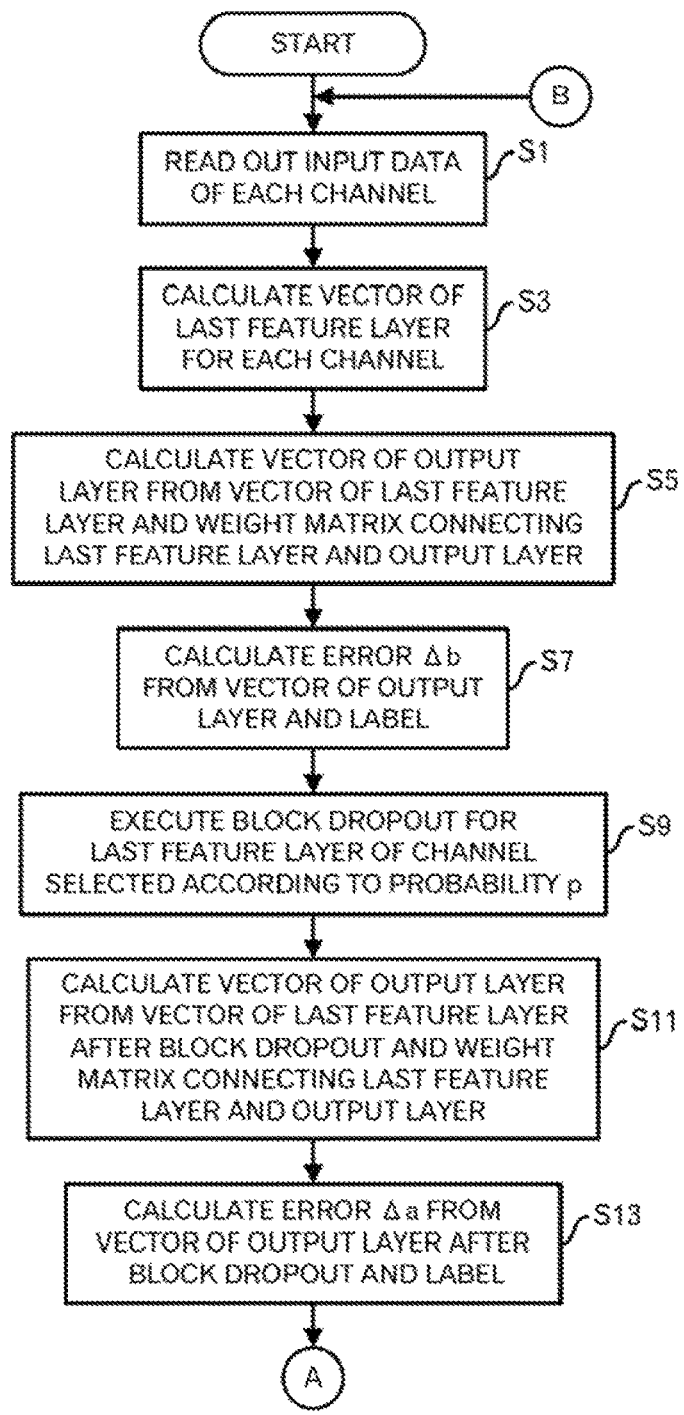
FIG. 6 is a diagram depicting a main processing flow.

First, the calculation unit 105 reads out input data that corresponds to each channel from the input data storage unit 101 (FIG. 6: step S1). The calculation unit 105 reads out input data according to predetermined rules. For example, pulse rate data is read out for channel $1c$, heart rate data is read out for channel $2c$, . . . , and brainwave data is read out for channel $kc$.

The calculation unit 105 executes, for each channel, calculation of the DNN and calculation of a vector of the last feature layer (step S3). The vector of the last feature layer is a vector that has, for example, values of nodes in the last feature layer as elements. The calculation unit 105 stores the calculation results of the values of each node and the like in the calculation result storage unit 103.

The calculation unit 105 calculates the vector of the output layer from the vector of the last feature layer and a weight matrix that is stored in the parameter storage unit 104 and that connects the last feature layer and the output layer (step S5), and stores the vector of the output layer in the calculation result storage unit 103.

Figure 7:
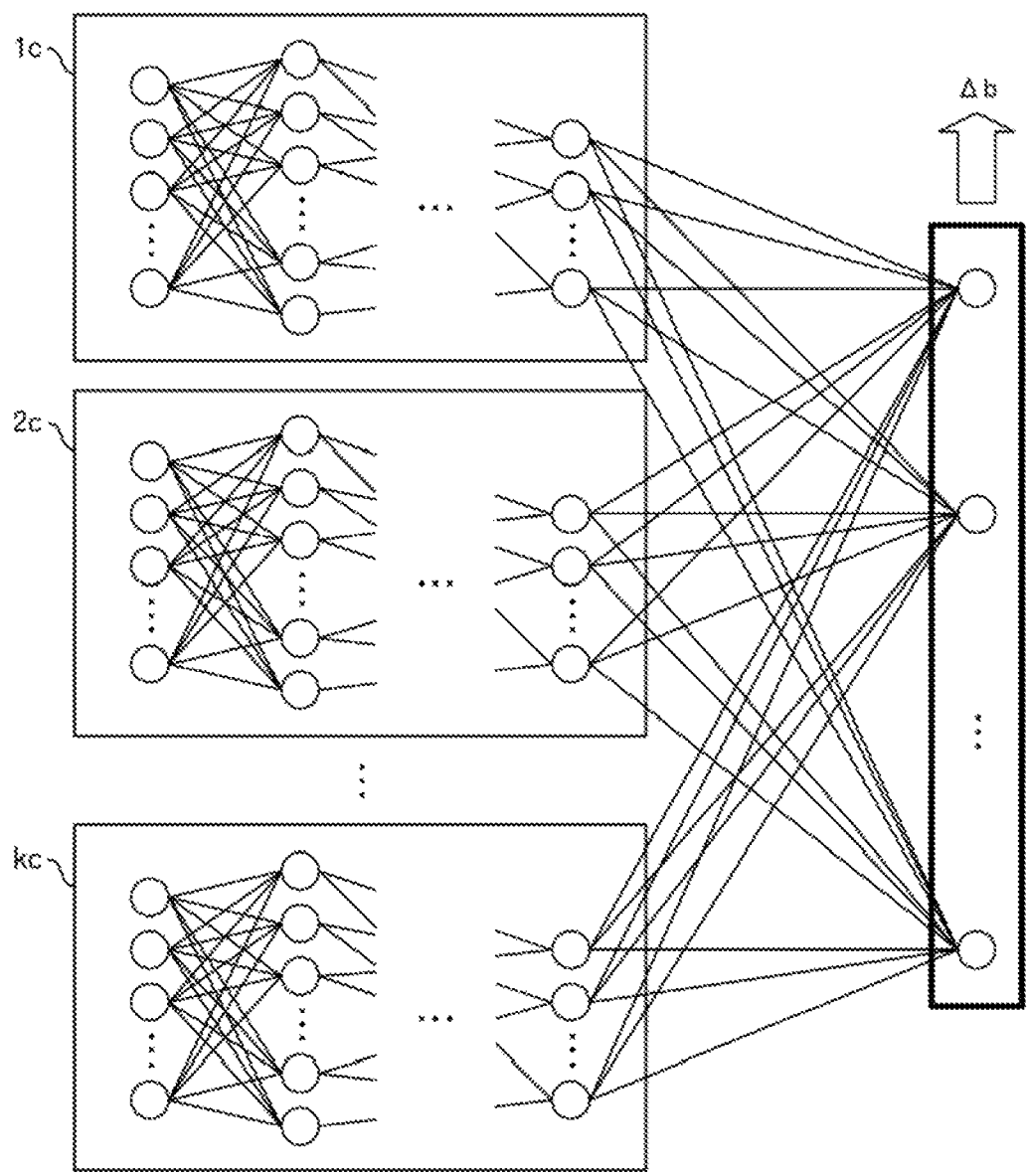
FIG. 7 is a diagram to explain calculation of $\Delta b$.

The calculation unit 105 calculates an error vector $\Delta b$ of the output layer from the vector of the output layer, which was calculated in step S5, and the labels that are stored in the label data storage unit 102 (step S7). In this embodiment, as illustrated in FIG. 7, nodes that are included in an area that is enclosed in bold lines are nodes of the output layer, and the error vector $\Delta b$ is calculated based on values of these nodes and the labels.

The processing of steps S1 to S7 is the same as in typical DNN calculation, and a detailed explanation is omitted here.

The calculation unit 105 selects, according to a predetermined probability p (for example, 0.5), a channel for which block dropout is to be executed, from among the channels is to $kc$. For example, when the number of channels is 10 and the probability p is 0.5, a probability that the block dropout is to be executed for a certain channel is 0.5, and 5 channels will be selected on average. The calculation unit 105 then executes block dropout for the last feature layer of the selected channel (step S9).

Dropout is processing to replace values of target nodes with 0 during feedforward, and is used for solving a problem of over learning in a DNN. Particularly, block dropout, which is a kind of dropout, is processing to replace values of all of nodes in the last feature layer of a channel with 0 at each learning opportunity. In the block dropout, because values of all nodes in the last feature layer are replaced with 0, the effect propagates to all nodes in the channel. On the other hand, in the case of the dropout in which values of only one node is replaced with 0, the effect is lessened by the other nodes for which the dropout was not executed. For details about the block dropout, refer to Non-patent Document 1.

Figure 8:
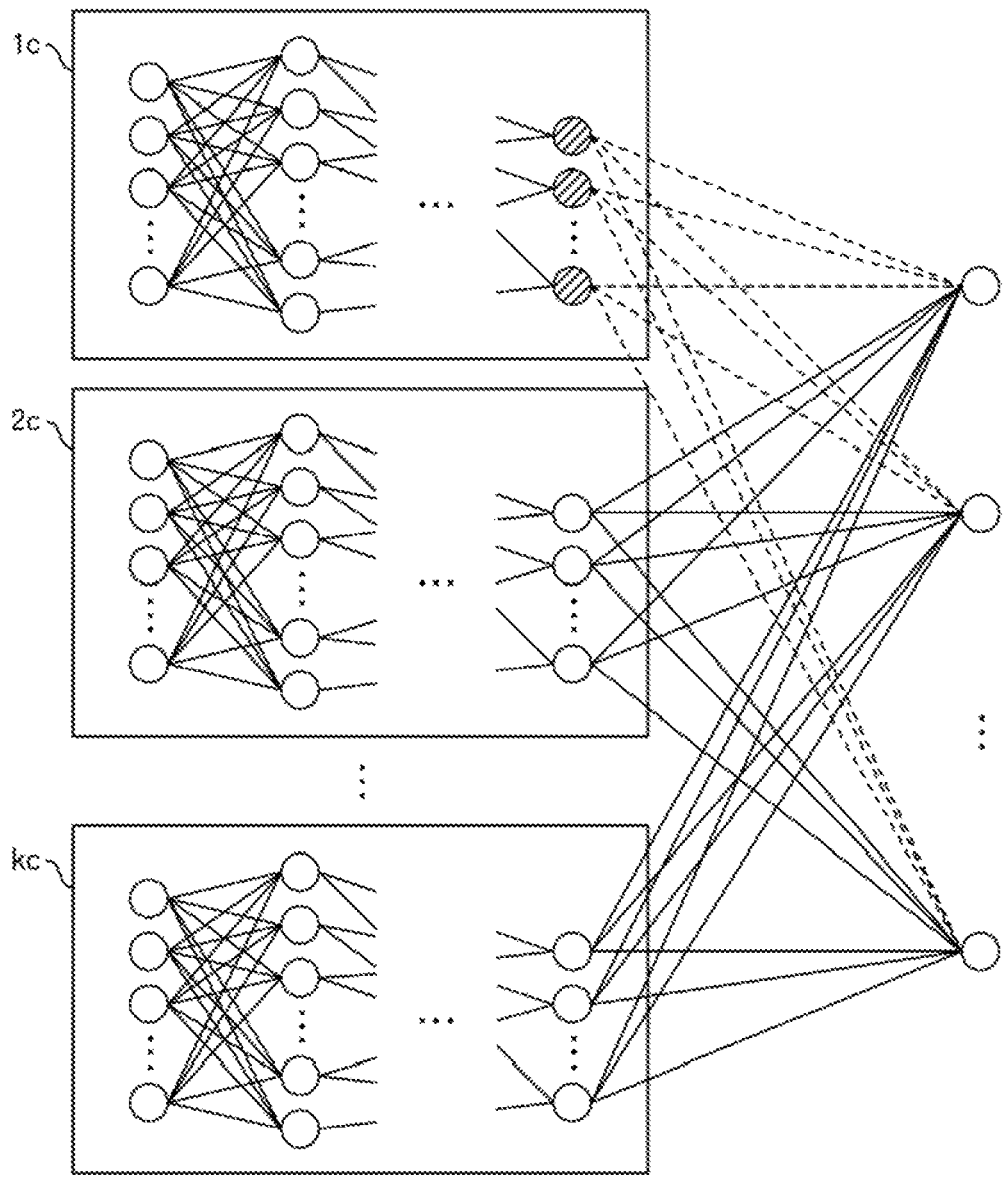
FIG. 8 is a diagram to explain block dropout.

Block dropout will be explained using FIG. 8. In FIG. 8, the hatched nodes are nodes for which block dropout was executed (or in other words, nodes of which values were replaced with 0), and the dashed edges are edges that are affected by the block dropout.

The calculation unit 105 calculates a vector for the output layer from the vector of the last feature layer after the block dropout and a weight matrix that is stored in the parameter storage unit 104 and that connects the last feature layer and the output layer (step S11). And the calculation unit 105 stores the vector of the output layer in the calculation result storage unit 103. The vector of the last feature layer after the block dropout is, for example, a vector whose subset of elements, which correspond to nodes in a channel for which the block dropout has been executed, have been replaced with 0.

Figure 9:
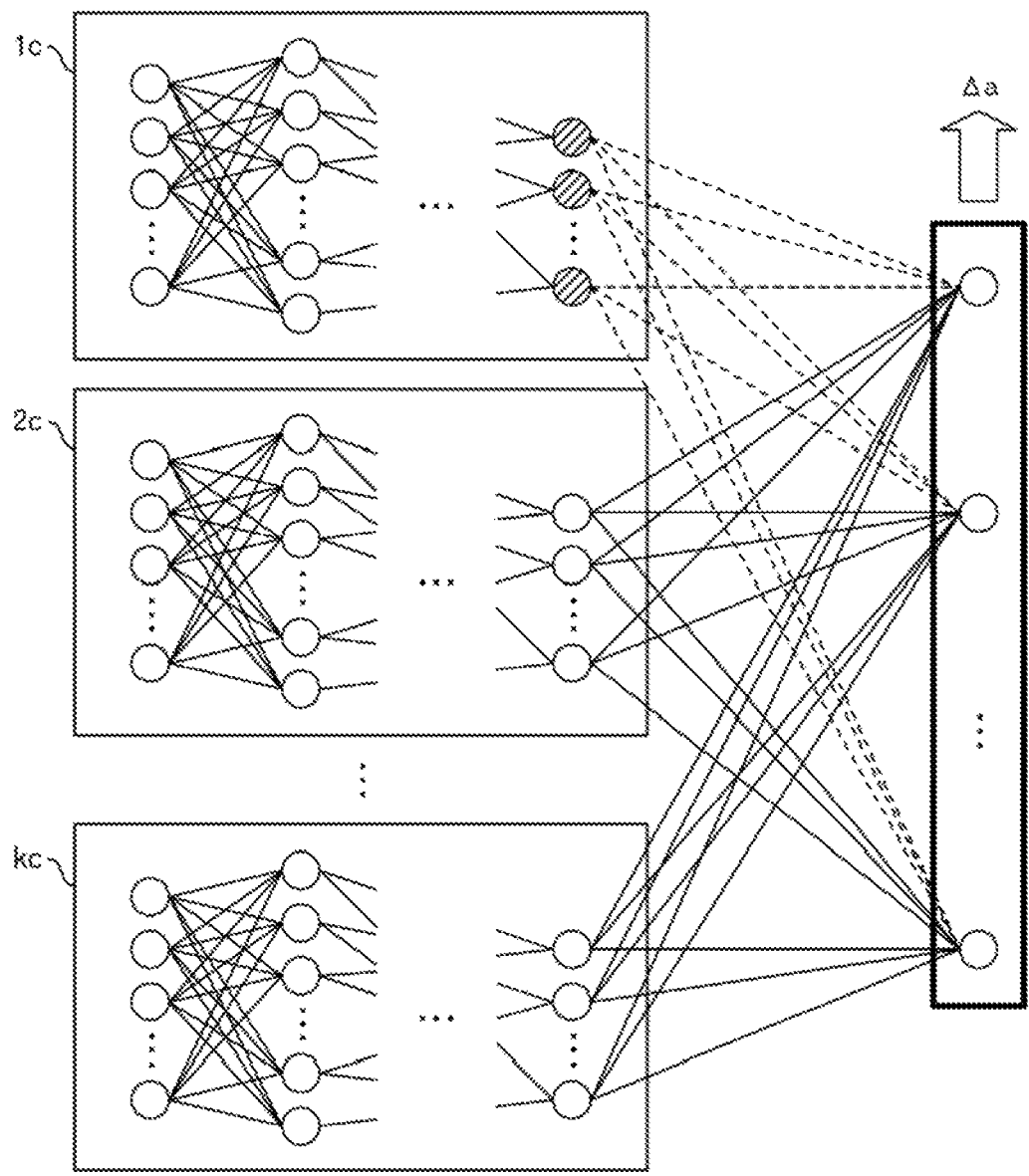
FIG. 9 is a diagram to explain calculation of $\Delta a$.

The calculation unit 105 calculates an error vector Δa for the output layer from the vector of the output layer, which was calculated in step S11, and the labels that is stored in the label data storage unit 102 (step S13). The processing then shifts to the processing of step S15 in FIG. 10 by way of terminal A. In this embodiment, as illustrated in FIG. 9, nodes that are included in an area that is enclosed within bold lines are nodes of the output layer. And the error vector Δa of the output layer is calculated based on values of these nodes and the labels. By the processing up to step S13, output errors when block dropout is executed and output errors when the block dropout is not executed are found from the same input data.

Figure 10:
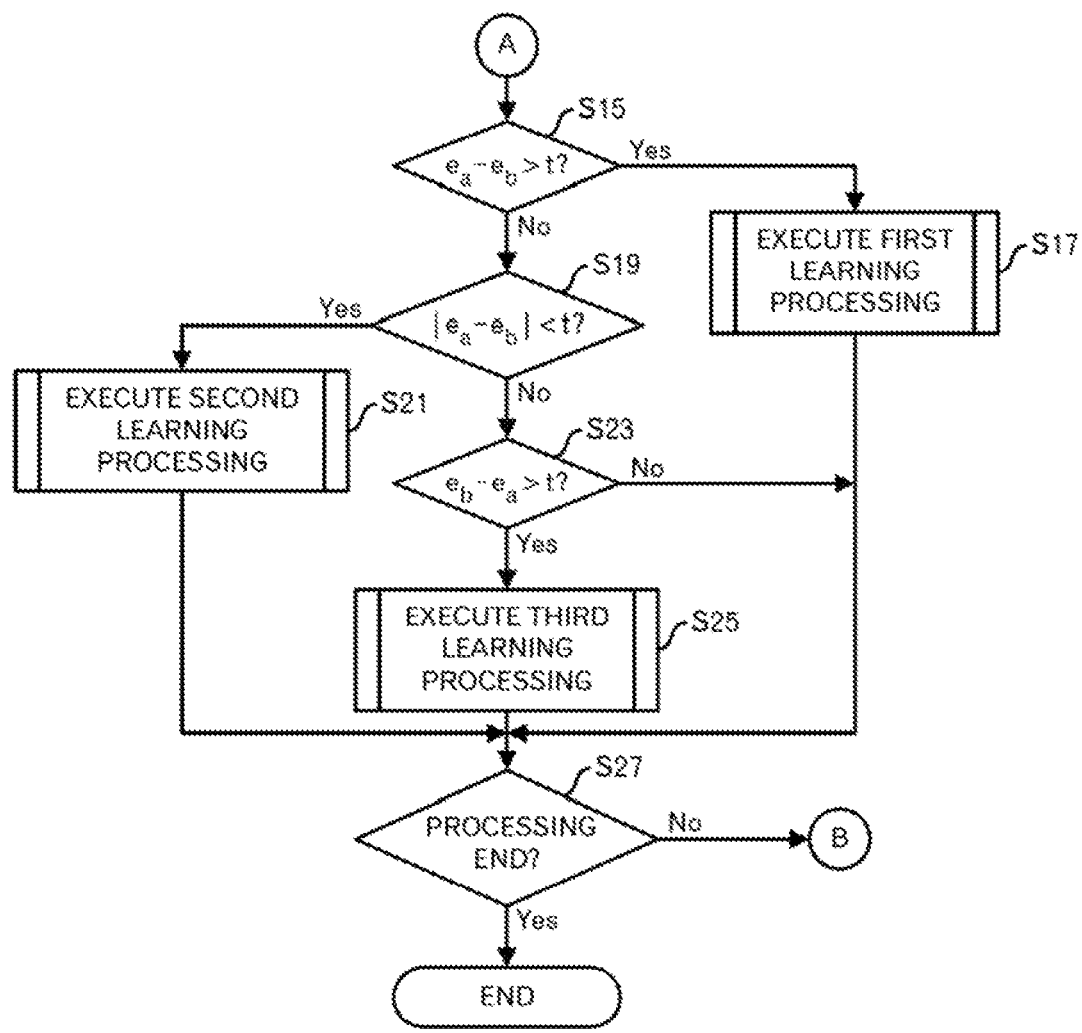
FIG. 10 is a diagram depicting the main processing flow.

Shifting to an explanation of FIG. 10, the calculation unit 105 calculates an error $e_a$ from the error vector Δa of the output layer when block dropout is executed, and calculates an error $e_b$ from the error vector Δb of the output layer when the block dropout is not executed. The error $e_a$ and error $e_b$ are calculated, for example, as a mean square error of elements of the vectors. The calculation unit 105 then determines whether a relationship $e_a-e_b>t$ holds (FIG. 10: step S15). Here, t is a predetermined threshold value that is set by an administrator.

When the relationship $e_a-e_b>t$ holds (step S15: YES route), the error has become large due to the block dropout, and learning for a channel for which the block dropout has been executed is considered to be proceeding suitably. Therefore, the calculation unit 105 gives an instruction to the first learning processing unit 106 to execute processing. Accordingly, the first learning processing unit 106 executes first learning processing (step S17). The first learning processing will be explained using FIG. 11 to FIG. 14.

Figure 11:
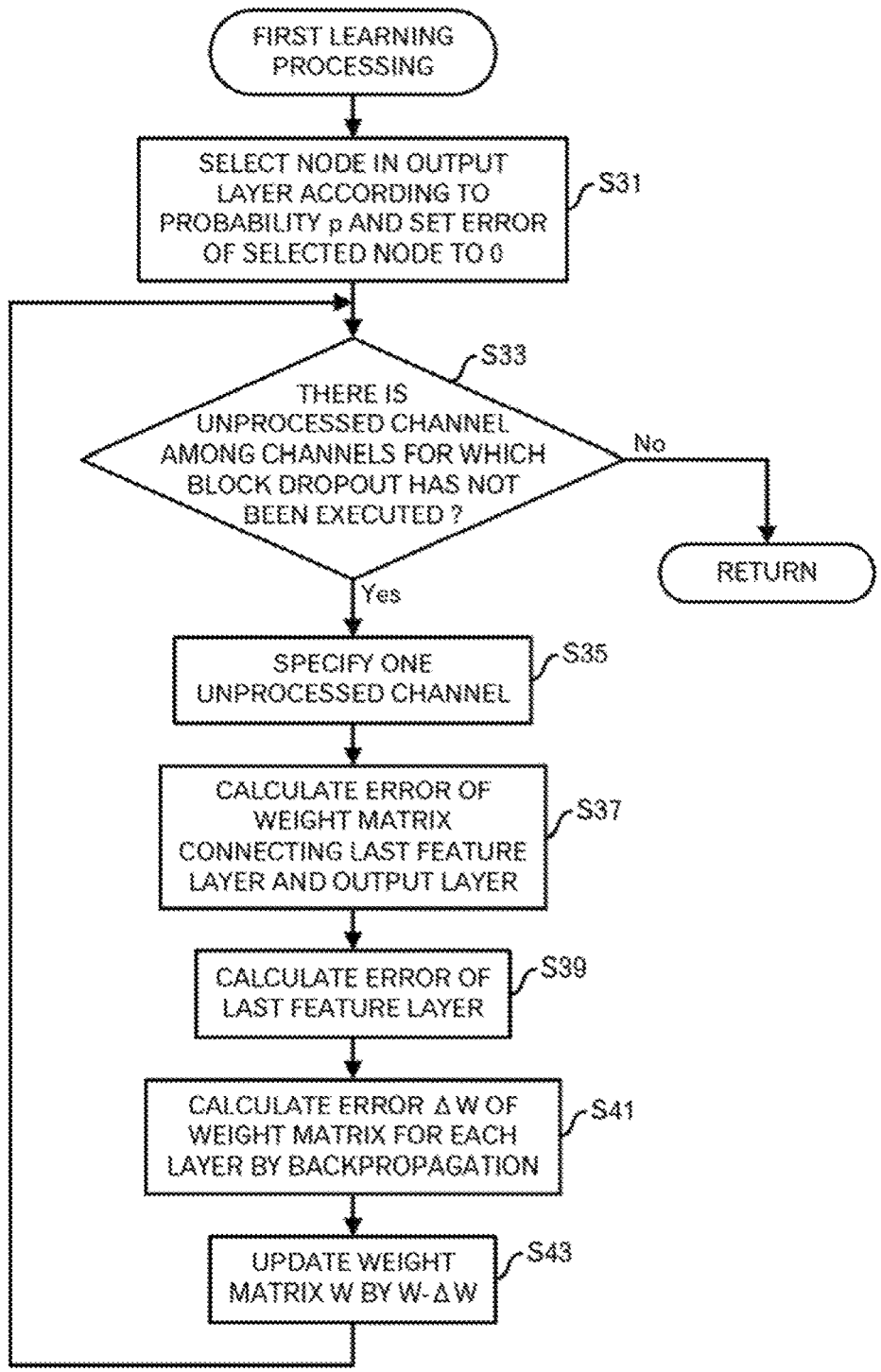
FIG. 11 is a diagram depicting a processing flow of first learning processing.

First, the first learning processing unit 106 reads out data that is stored in the calculation result storage unit 103 and parameters (for example, weighing matrices) that are stored in the parameter storage unit 104. Then, the first learning processing unit 106 selects, according to the probability p (for example, 0.5), nodes for which dropout is to be executed from nodes in the output layer. The first learning processing unit 106 then sets errors of the selected nodes to 0 (FIG. 11: step S31). For example, when the number of nodes of the output layer is 10 and the probability p is 0.5, a probability that the dropout is to be executed for a certain node is 0.5, and errors of 5 nodes will be set to 0 on average. In this embodiment, processing to replace the errors of the nodes of the output layer with 0 as in step S31 is called back dropout.

Figure 12:
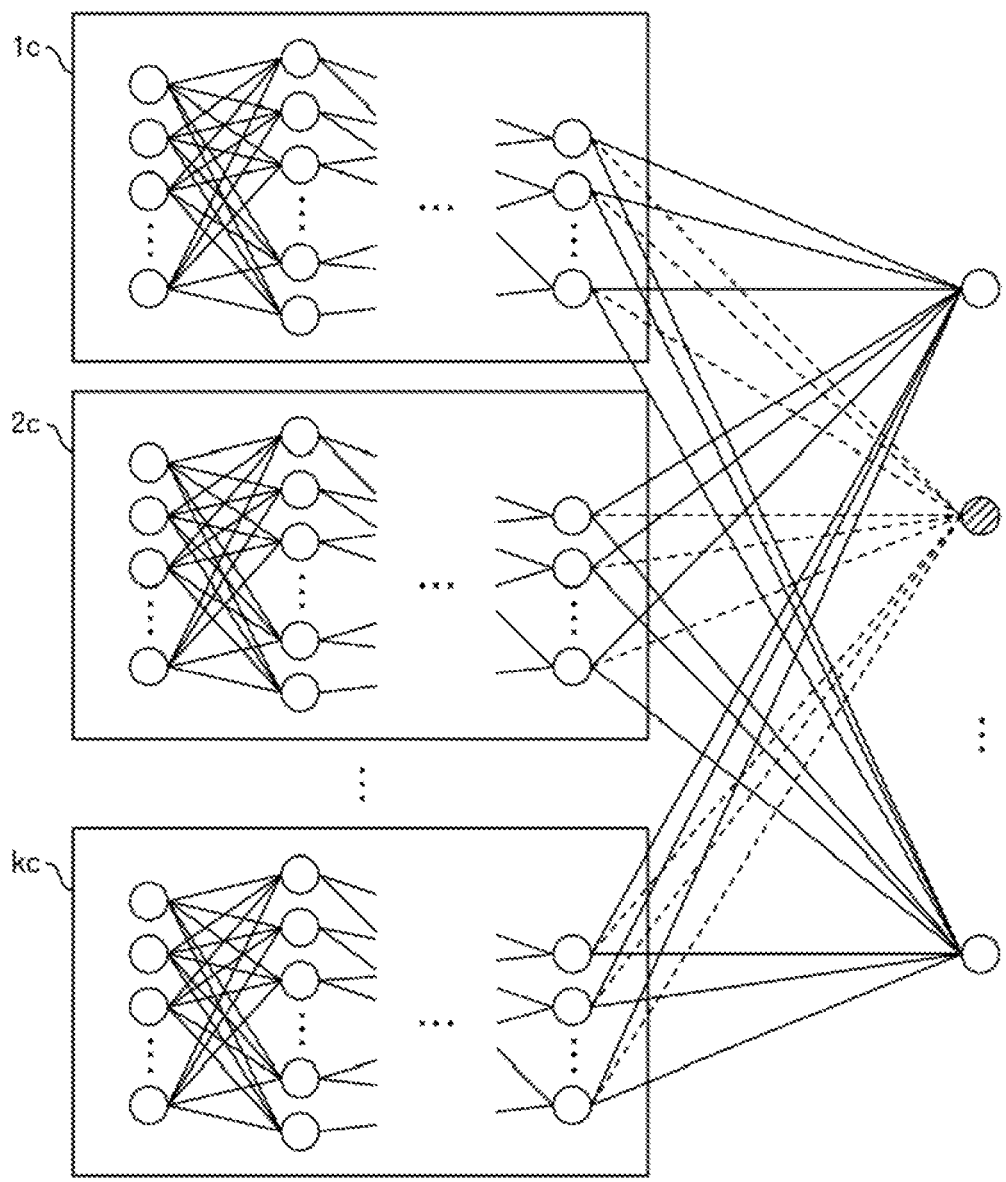
FIG. 12 is a diagram to explain back dropout.

Back dropout will be explained using FIG. 12. In FIG. 12, a hatched node among nodes in the output layer is a node for which the back dropout is executed. The dashed edges are edges that are affected by the back dropout. In this way, by performing back dropout for an error of an output that was selected at random for each learning opportunity, it is possible to more vigorously perform learning of a channel that does not affect that output based on errors of outputs that are affected by that channel. As a result, it becomes possible to improve precision of classification.

The first learning processing unit 106 determines whether there are any unprocessed channels among channels for which the block dropout in step S9 has not been executed (step S33). When there is an unprocessed channel among the channels for which the block dropout has not been executed (step S33: YES route), the first learning processing unit 106 specifies one unprocessed channel among the channels for which the block dropout has not been executed (step S35).

The first learning processing unit 106 calculates an error of the weight matrix that connects the last feature layer and the output layer, for the channel that was specified in step S35 (step S37).

The calculation of step S37 is based on calculation using backpropagation. The backpropagation is a method of performing an update by uniformly distributing, to units in the previous layer, errors between the labels and values of the output layer, which were calculated using parameters before the update. This method is based on an assumption that the cause of errors exists to the same extent in each unit. In order to simplify the explanation, it will be presumed that the last feature layer and the output layer are connected directly. And a vector of the last feature layer is taken to be v, a weight matrix that connects the last feature layer and the output layer is taken to be W, and a vector of the values of the output layer is taken to be a. In this case, the following relationship holds.

$$v*W=a$$

Therefore, it is possible to calculate an error of the weight matrix ΔW as follows.

$$\Delta W = v^T * \Delta a$$

Accordingly, by calculating W−ΔW, it becomes possible to find the updated W.

The first learning processing unit 106 calculates errors of the last feature layer of the channel that was specified in step S35 based on the error ΔW of the weight matrix, which was calculated in step S37 (step S39). The processing of step S37 is part of processing of the typical backpropagation, and a detailed explanation will be omitted here.

The first learning processing unit 106 calculates the error ΔW of the weight matrix for each layer of the channel that was specified in step S35 by using the backpropagation that is based on the errors of the last feature layer, which were calculated in step S39 (step S41). The processing of step S41 is also the typical backpropagation, and that processing was simply explained for step S37. Accordingly, a detailed explanation will be omitted here.

The first learning processing unit 106 updates the weight matrix W by W−ΔW, by using the error ΔW of the weight matrix, which was calculated in steps S37 and S41 (step S43). The first learning processing unit 106 updates the weight matrix W that is stored in the parameter storage unit 104 with the updated weight matrix W. The processing then returns to the processing of step S33. The weight matrix W that connects the last feature layer and the output layer may also be updated in step S39.

On the other hand, when there are no unprocessed channels among the channels that are not an object of block dropout (step S33: NO route), the processing returns to the processing of the calling source.

Figure 13:
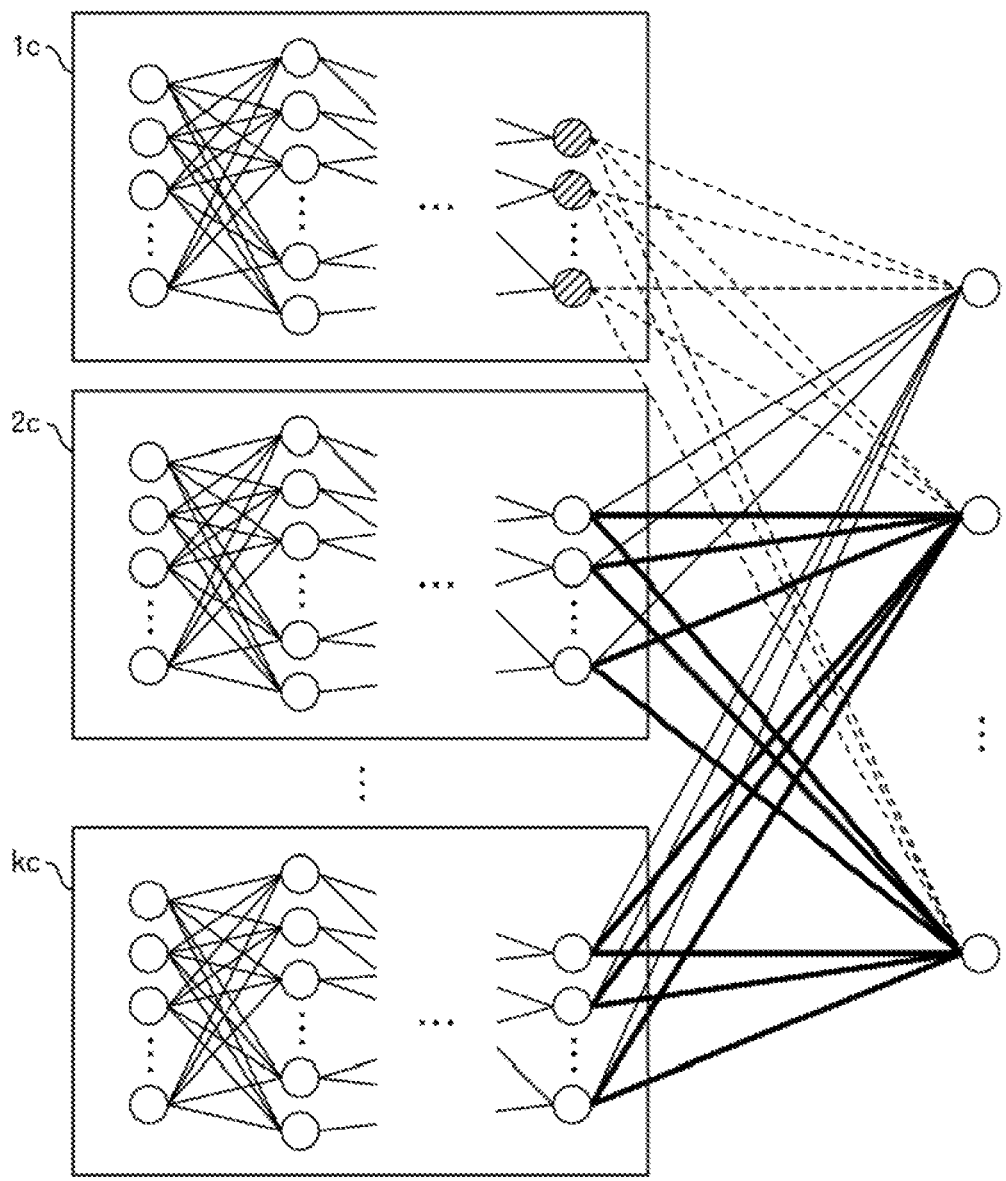
FIG. 13 is a diagram to explain the first learning processing.
Figure 14:
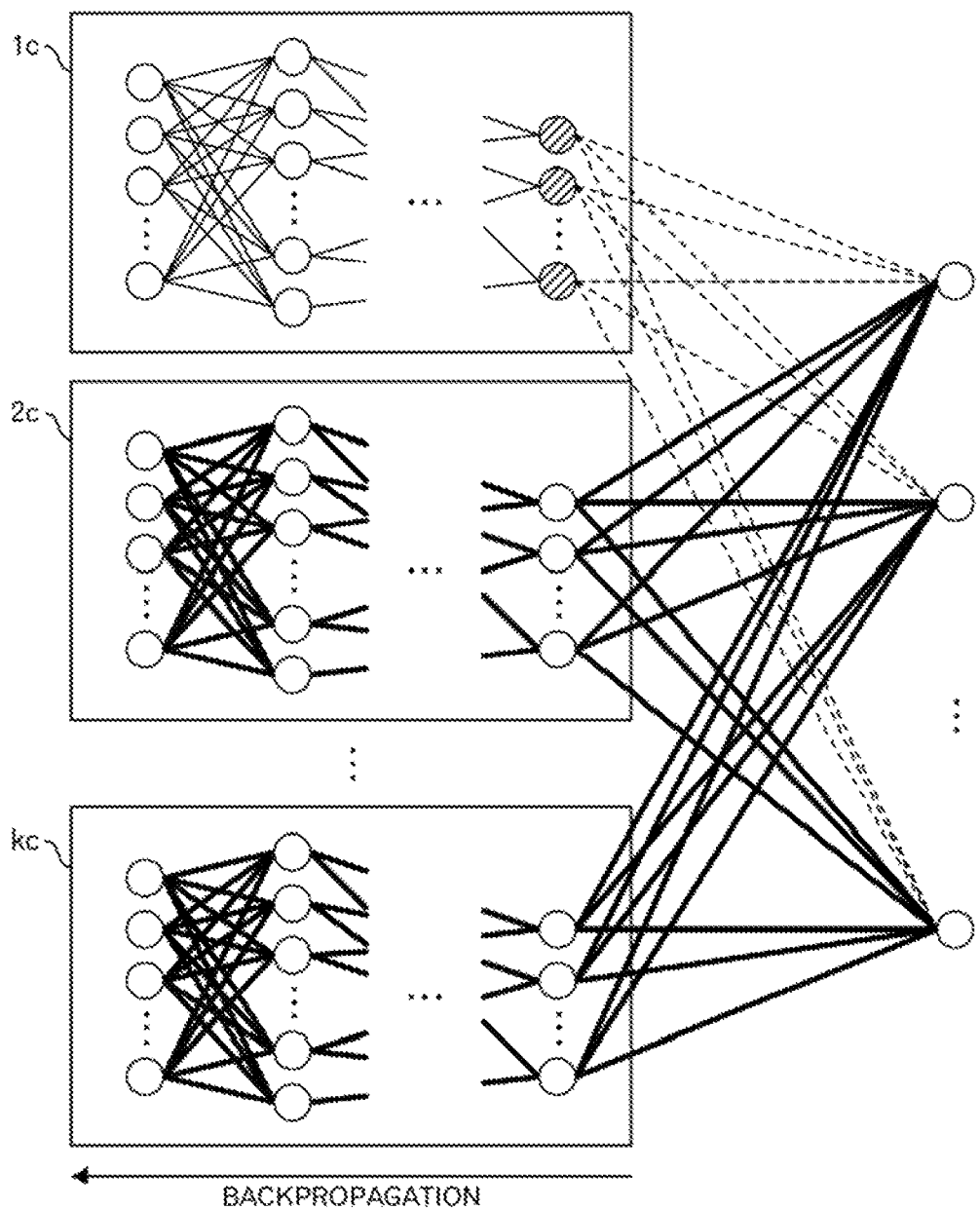
FIG. 14 is a diagram to explain the first learning processing.

An explanation of the first learning processing will be added using FIG. 13 and FIG. 14. In the first learning process, the error ΔW of the weight matrix that connects the output layer and the last feature layer of a channel for which block dropout has not been executed is calculated. As illustrated in FIG. 13, learning of the weight matrix W that connects the last feature layer and the output layer is performed using the calculated W. Furthermore, the error ΔW of the weight matrix is calculated for each layer of the channel for which the block dropout has not been executed by using a backpropagation. Then, as illustrated in FIG. 14, learning of the weight matrix W of each layer of the channel for which the block dropout has not been executed is performed by the calculated W. Actually, back dropout is also performed, and dropout is performed for at least one of the nodes of the output layer. However, in order to simplify the explanation, performing dropout for nodes in the output layer is not illustrated in FIG. 13 and FIG. 14. The same is also true in the following figures as well.

In this way, when learning of a channel for which the block dropout has been executed is considered to be proceeding properly, learning of the channel for which the block dropout has been executed is not performed, and learning is performed for channels for which the block dropout has not been executed by a normal backpropagation. The reason for this is that by further performing learning of a channel for which learning is already proceeding properly, learning proceeds in a worse direction than in a current state, and precision of classification may decrease.

Returning to an explanation of FIG. 10, when the relationship $e_a-e_b>t$ does not hold (step S15: NO route), the calculation unit 105 determines whether the relationship $|e_a-e_b|<t$ holds (step S19). When the relationship $|e_a-e_b|<t$ holds (step S19: YES route), there is a possibility that the effect of block dropout is small because learning of the channel for which the block dropout has been executed is not proceeding properly. There is also a possibility that the effect on a output is originally small, however, if processing is not performed, learning does not proceed forever in the former case. Therefore, the calculation unit 105 instructs the second learning processing unit 107 to execute processing. Accordingly, the second learning processing unit 107 executes a second learning processing (step S21). The second learning processing will be explained using FIG. 15 to FIG. 20.

Figure 15:
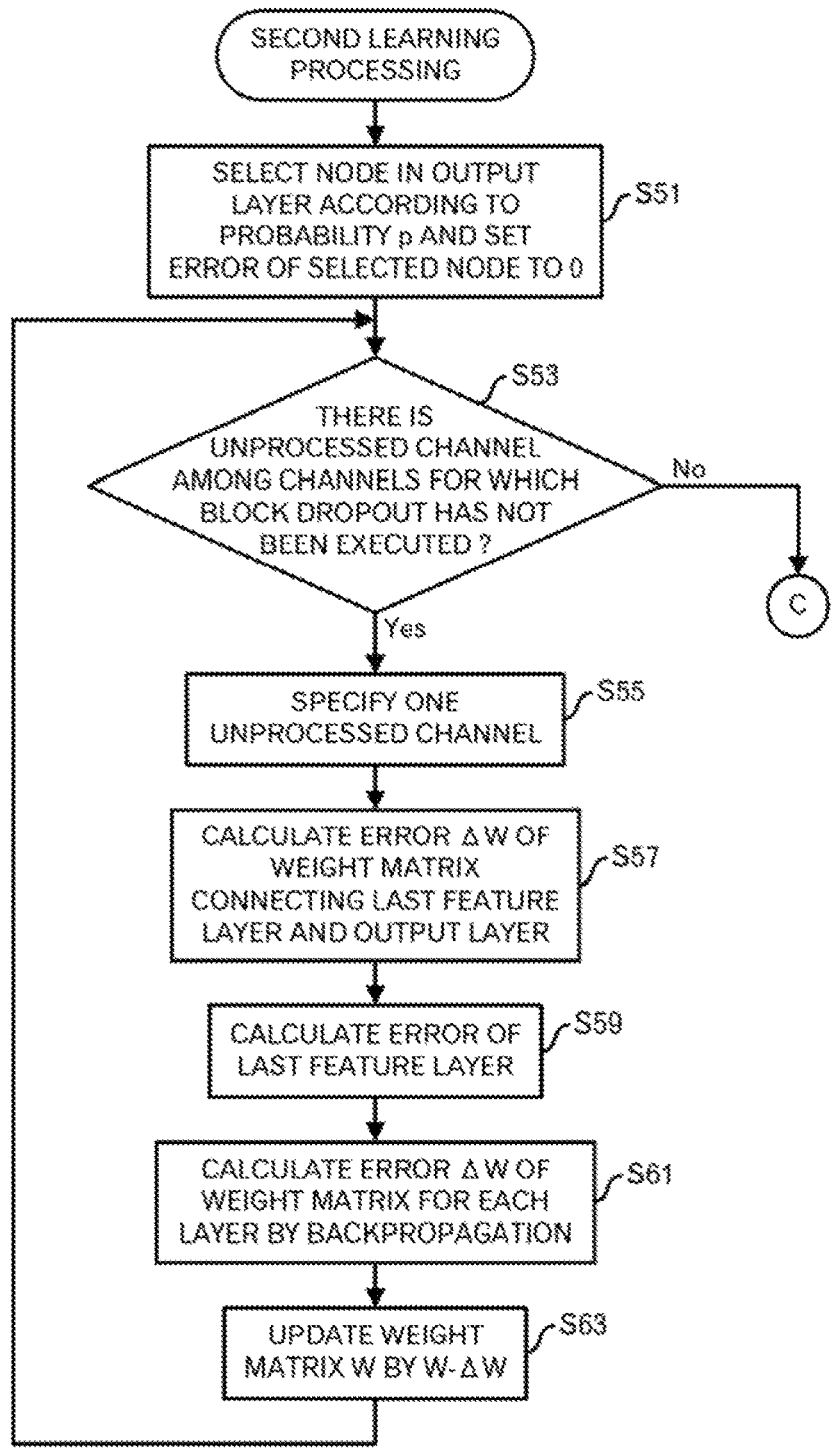
FIG. 15 is a diagram depicting a processing flow of second learning processing.

First, the second learning processing unit 107 reads out data that is stored in the calculation result storage unit 103 and parameters (for example, weight matrices) that are stored in the parameter storage unit 104. Then, the second learning processing unit 107 selects, according to the probability p (for example, 0.5), nodes for which dropout is to be executed from among nodes of the output layer. The second learning processing unit 107 then sets errors of the selected nodes to 0 (FIG. 15: step S51). In other words, the second learning processing unit 107 executes back dropout.

The second learning processing unit 107 determines whether there are any unprocessed channels among channels for which the block dropout in step S9 has not been executed (step S53). When there are unprocessed channels among the channels for which the block dropout has not been executed (step S53: YES route), the second learning processing unit 107 specifies one unprocessed channel among the channels that are not an object of block dropout (step S55).

The second learning processing unit 107 calculates, for the channel that was specified in step S55, the error ΔW of the weight matrix that connects the last feature layer and the output layer (step S57).

The second learning processing unit 107 calculates errors of the last feature layer for the channel that was specified in step S55 based on the error ΔW of the weight matrix, which was calculated in step S57 (step S59). The processing of step S57 is part of the processing of the typical backpropagation, and a detailed explanation is omitted here.

The second learning processing unit 107 calculates the error ΔW of the weight matrix for each layer of the channel that was specified in step S55 by using backpropagation that is based on the errors of the last feature layer, which were calculated in step S59 (step S61). The processing of step S61 is also part of the processing of a typical backpropagation, and a detailed explanation is omitted here.

The second learning processing unit 107 updates the weight matrix W by W−ΔW by using the error ΔW of the weight matrix, which was calculated in steps S57 and S61 (step S63). The second learning processing unit 107 updates the weight matrix W that is stored in the parameter storage unit 104 with the updated weight matrix W. The processing then returns to the processing of step S53. The weight matrix W that connects the last feature layer and the output layer may also be updated in step S59.

On the other hand, when there are no unprocessed channels among the channels for which the block dropout has not been executed (step S53: NO route), the processing shifts to the processing that is explained in FIG. 16 by way of the terminal C.

The processing of steps S51 to S63 are the same as the processing of steps S31 to S43.

Figure 16:
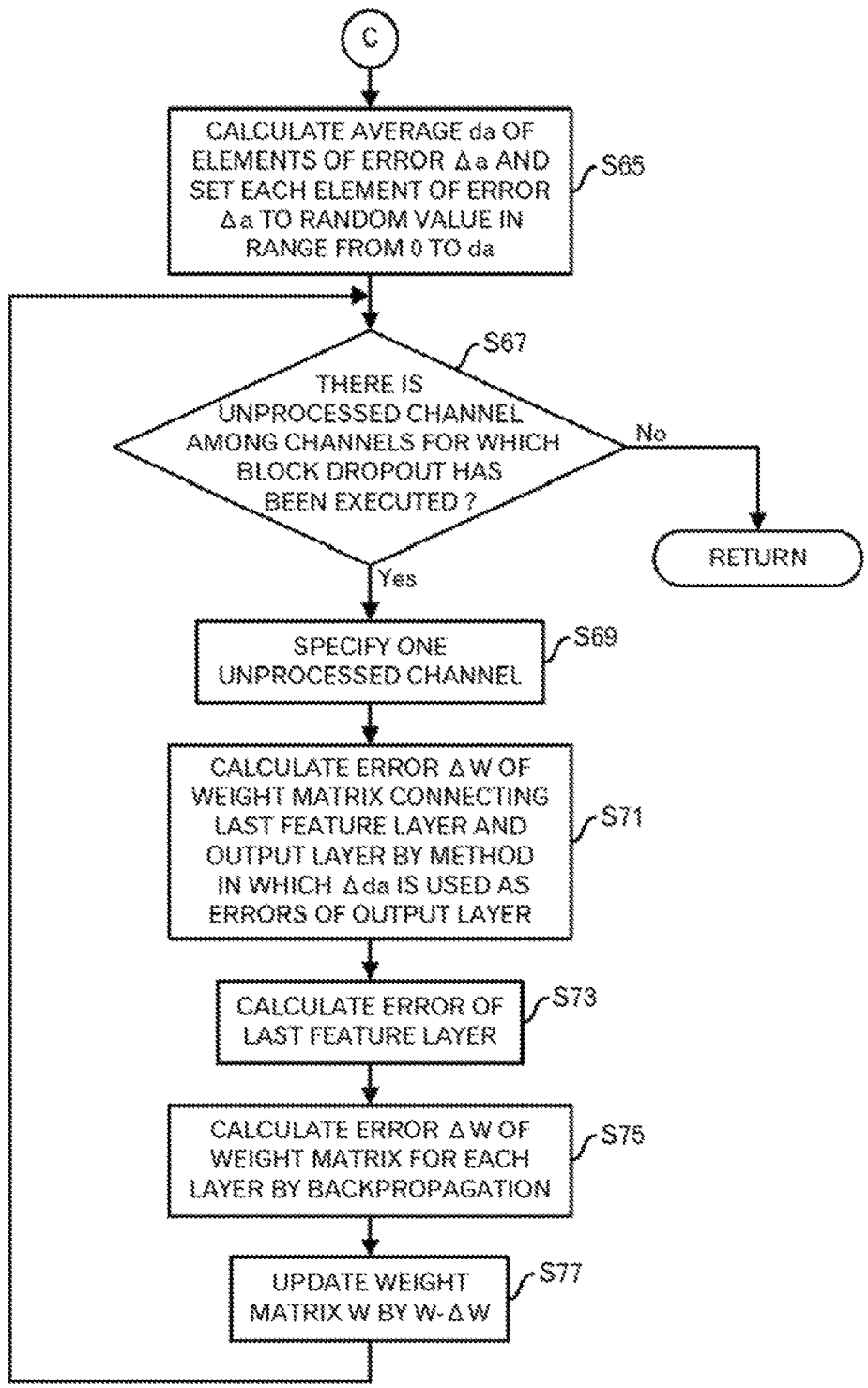
FIG. 16 is a diagram depicting a processing flow of the second learning processing.

Shifting to an explanation of FIG. 16, the second learning processing unit 107 calculates an average da of elements of the error vector Δa of the output layer, and sets random numbers within a range 0 to da as each element of the error Δa (FIG. 16: step S65). The vector of errors of the output layer after setting is taken to be Δda.

Figure 17:
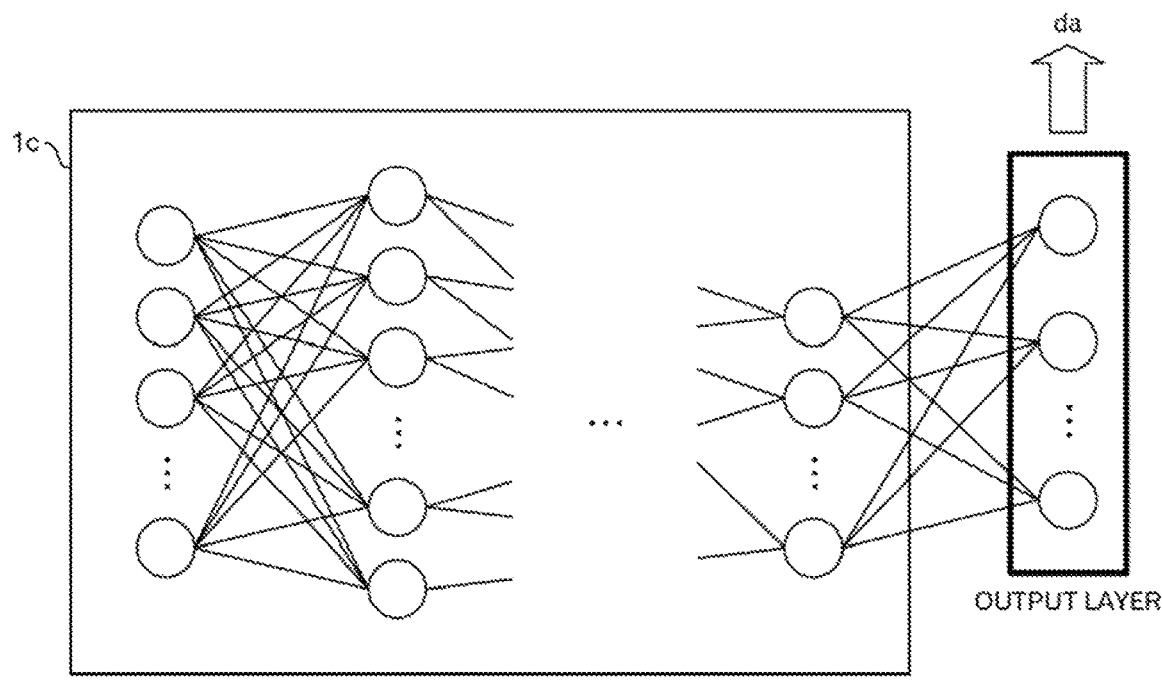
FIG. 17 is a diagram to explain processing to replace output errors with random values.
Figure 18:
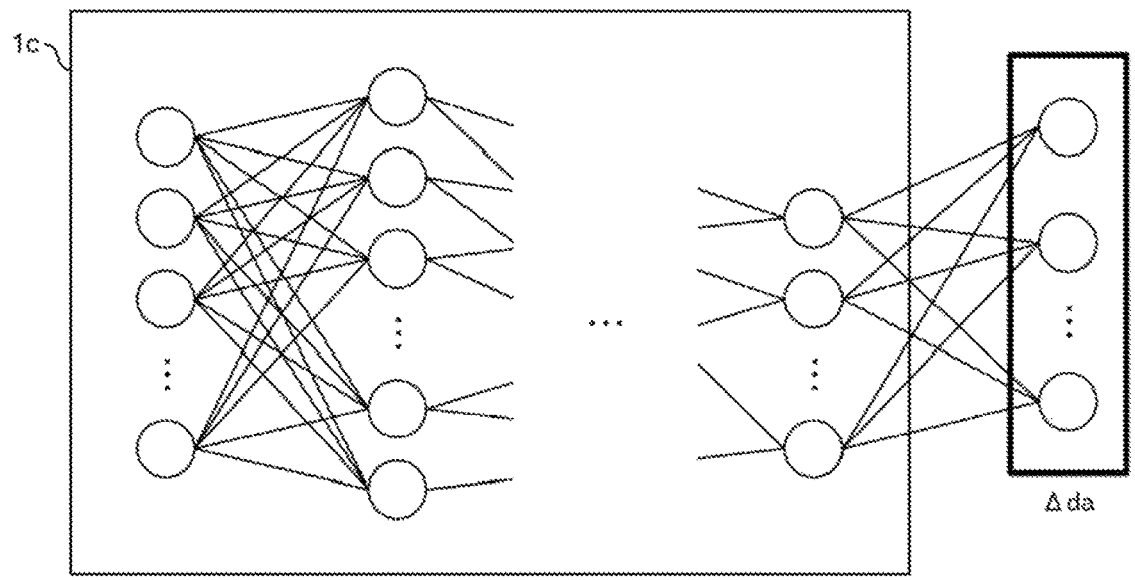
FIG. 18 is a diagram to explain processing to replace output errors with random values.

The processing of step S65 will be explained using FIG. 17 and FIG. 18. In FIG. 17 and FIG. 18, channel 1c is taken to be an object of block dropout in step S9. The nodes that are enclosed within the bold lines are nodes of the output layer. As illustrated in FIG. 17, an average of values of errors of the output layer corresponds to da. However, da may be found as a maximum or root mean squared error. Then, as illustrated in FIG. 18, each element of the error vector Δa of the output layer is set to a random value that is within the range from 0 to da. When there is a possibility that the learning has fallen into a bad state, by setting these kinds of random values, learning leaves the bad state and proceeds.

The second learning processing unit 107 determines whether there are any unprocessed channels among the channels for which the block dropout in step S9 has been executed (step S67). When there are unprocessed channels among the channels for which the block dropout has been executed (step S67: YES route), the second learning processing unit 107 specifies one unprocessed channel from among the channels for which the block dropout has been executed (step S69).

The second learning processing unit 107 calculates, for the channel that was specified in step S69, the error ΔW of the weight matrix that connects the last feature layer and the output layer, by using a calculation method in which Δda is used as an error of the output layer (step S71). In step S71, calculation is performed by using the following expression that is based on the backpropagation.

$$\Delta W^i = {i^T} * \Delta da$$

Here, i is a number that represents a layer, and in the processing of step S71, a number that represents the last feature layer is set as i. A vector of values of the ith layer is $v^i$, and $\Delta W^i$ is the error ΔW of the weight matrix that connects the ith layer and the (i+1)th layer.

The second learning processing unit 107 calculates errors of the last feature layer in the channel that was specified in step S69, based on the error ΔW of the weight matrix, which was calculated in step S71 (step S73). The processing of step S71 is part of the processing of the typical backpropagation, and a detailed explanation is omitted here.

The second learning processing unit 107 calculates the error ΔW of the weight matrix for each layer of the channel that was specified in step S69 by using backpropagation that is based on the errors of the last feature layer, which were calculated in step S73 (step S75). The processing of step S75 is also part of the processing of the typical backpropagation, and a detailed explanation is omitted here.

The second learning processing unit 107 updates the weight matrix W by W−ΔW, by using the error ΔW of the weight matrix, which was calculated in steps S71 and S75 (step S77). The second learning processing unit 107 updates the weight matrix that is stored in the parameter storage unit 104 with the updated weight matrix W. The processing then returns to the processing of step S67. The weight matrix W that connects the last feature layer and the output layer may also be updated is step S73.

On the other hand, when there are no unprocessed channels among the channels for which the block dropout has been executed (step S67: NO route), the processing returns to the processing of the calling source.

Figure 19:
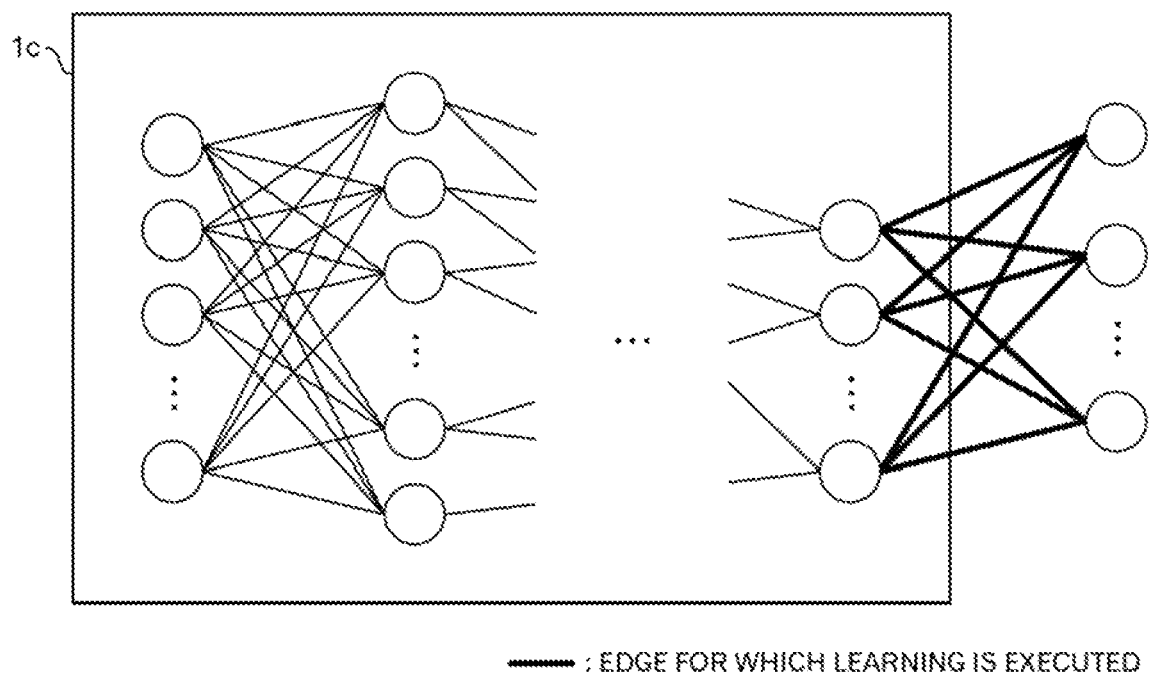
FIG. 19 is a diagram to explain the second learning processing.
Figure 20:
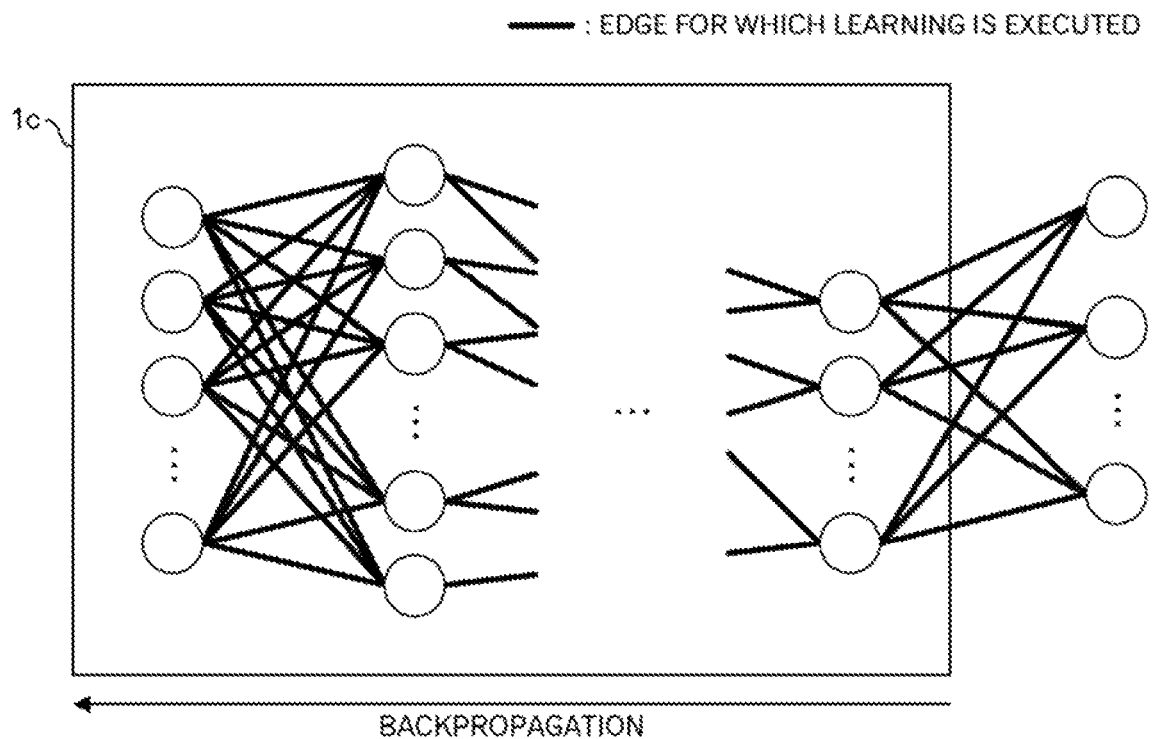
FIG. 20 is a diagram to explain the second learning processing.

An explanation is added for processing that is included in the second learning processing and is processing to update parameters of channels for which block dropout has been executed. In the second learning processing, the error ΔW of the weight matrix that connects the last feature layer of a channel for which the block dropout has been executed and the output layer is calculated using Δda. Then, as illustrated in FIG. 19, learning of the weight matrix W that connects the last feature layer and the output layer is performed using the calculated W. Furthermore, the error ΔW of the weight matrix is calculated for each layer of the channel for which the block dropout has been executed, by using the backpropagation. Then, as illustrated in FIG. 20, learning of the weight matrix W for each layer of the channel is performed using the calculated W.

As described above, when there is a possibility that the effect of block dropout is small because learning of a channel for which block dropout has been executed is not proceeding properly, learning is also performed for channels for which the block dropout has been executed not just for channels for which the block dropout has not been executed. As a result, learning of the channels for which the block dropout has been executed proceeds and it becomes possible to further improve precision of classification.

Returning to the explanation of FIG. 10, when the relationship $|e_a - e_b| < t$ does not hold (step S19: NO route), the calculation unit 105 determines whether the relationship $e_b - e_a > t$ holds (step S23). When the relationship $e_b - e_a > t$ does not hold (step S23: NO route), the processing shifts to the processing of step S27. However, when the relationship $e_b - e_a > t$ holds (step S23: YES route), learning of the channel for which the block dropout has been executed is considered not to be proceeding properly. Therefore, the calculation unit 105 instructs the third learning processing unit 108 to execute processing. Accordingly, the third learning processing unit 108 executes third learning processing (step S25). The third learning processing will be explained using FIG. 21 to FIG. 25.

Figure 21:
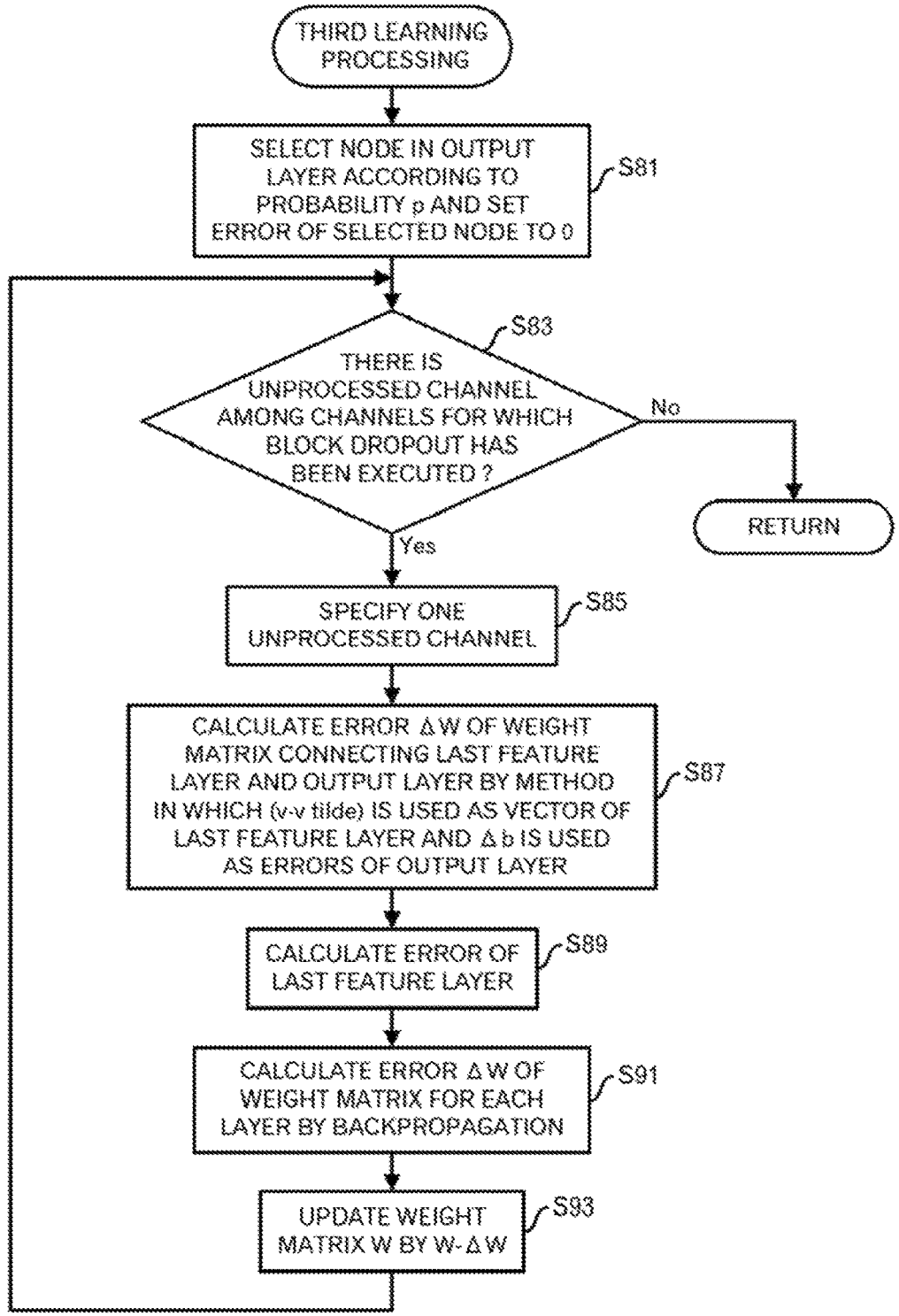
FIG. 21 is a diagram depicting a processing flow of third learning processing.

First, the third learning processing unit 108 reads out data that is stored in the calculation result storage unit 103 and parameters (for example, weight matrices) that are stored in the parameter storage unit 104. The third learning processing unit 108 then selects, according to the probability p (for example, 0.5), nodes for which dropout is to be executed from among nodes of the output layer. Then, the third learning processing unit 108 sets errors of the selected nodes to 0 (FIG. 21: step S81). In other words, the third learning processing unit 108 executes back dropout.

The third learning processing unit 108 determines whether there are any unprocessed channels among channels for which the block dropout in step S9 has been executed (step S83). When there are unprocessed channels among the channels for which the block dropout has been executed (step S83: YES route), the third learning processing unit 108 specifies one unprocessed channel of the channels for which the block dropout in step S9 has been executed (step S85).

The third learning processing unit 108 calculates the error ΔW of the weight matrix that connects the last feature layer and the output layer for the channel that was specified in step S85, by using a calculation method in which $(v - \tilde{v})$ is used as a vector of the last feature layer and Δb is used as an error of the output layer (step S87). In step S87, calculation is performed using the following expression that is based on the backpropagation.

$$\Delta W = (v - \tilde{v})^T * \Delta b$$

Figure 22:
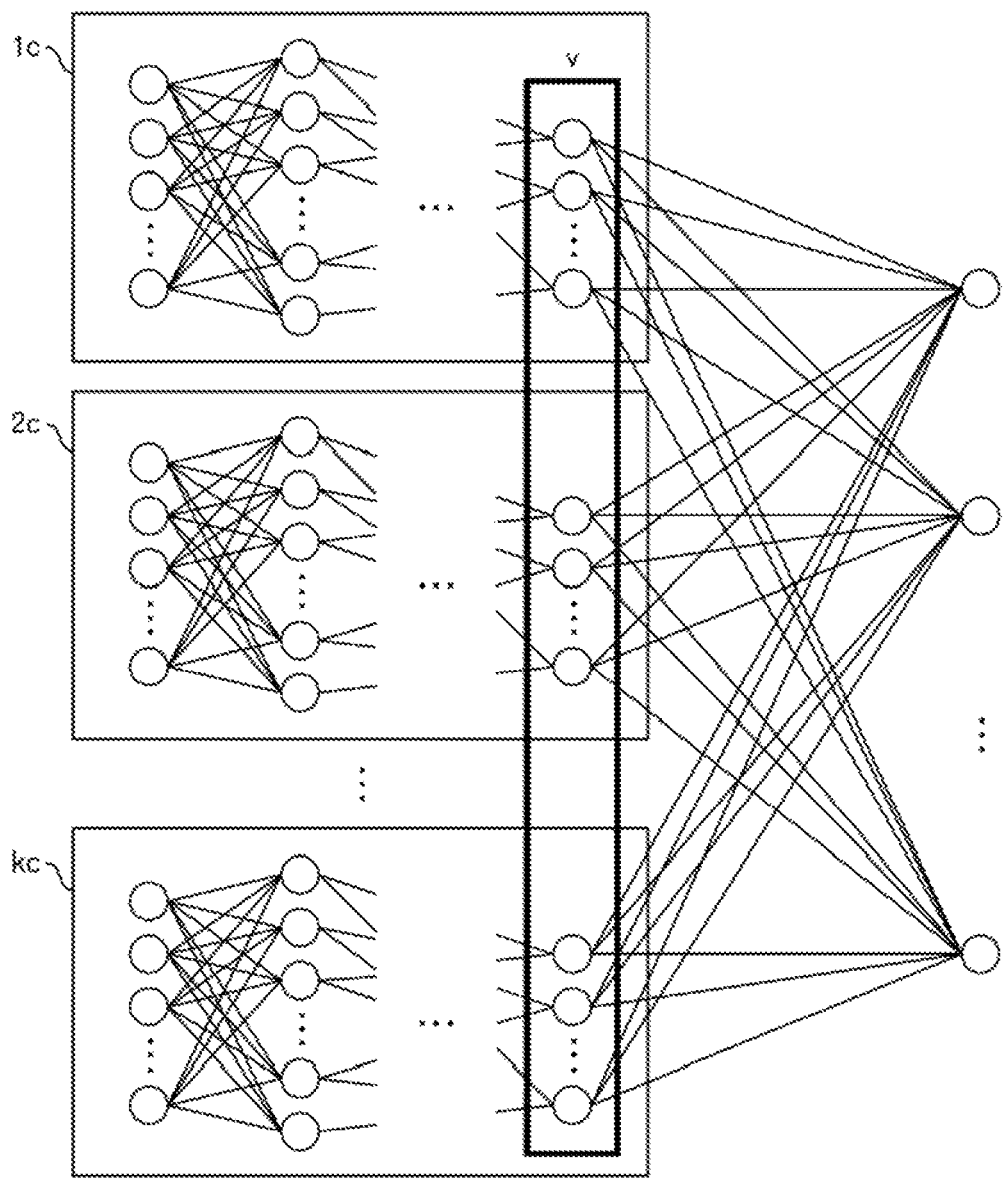
FIG. 22 is a diagram to explain v.
Figure 23:
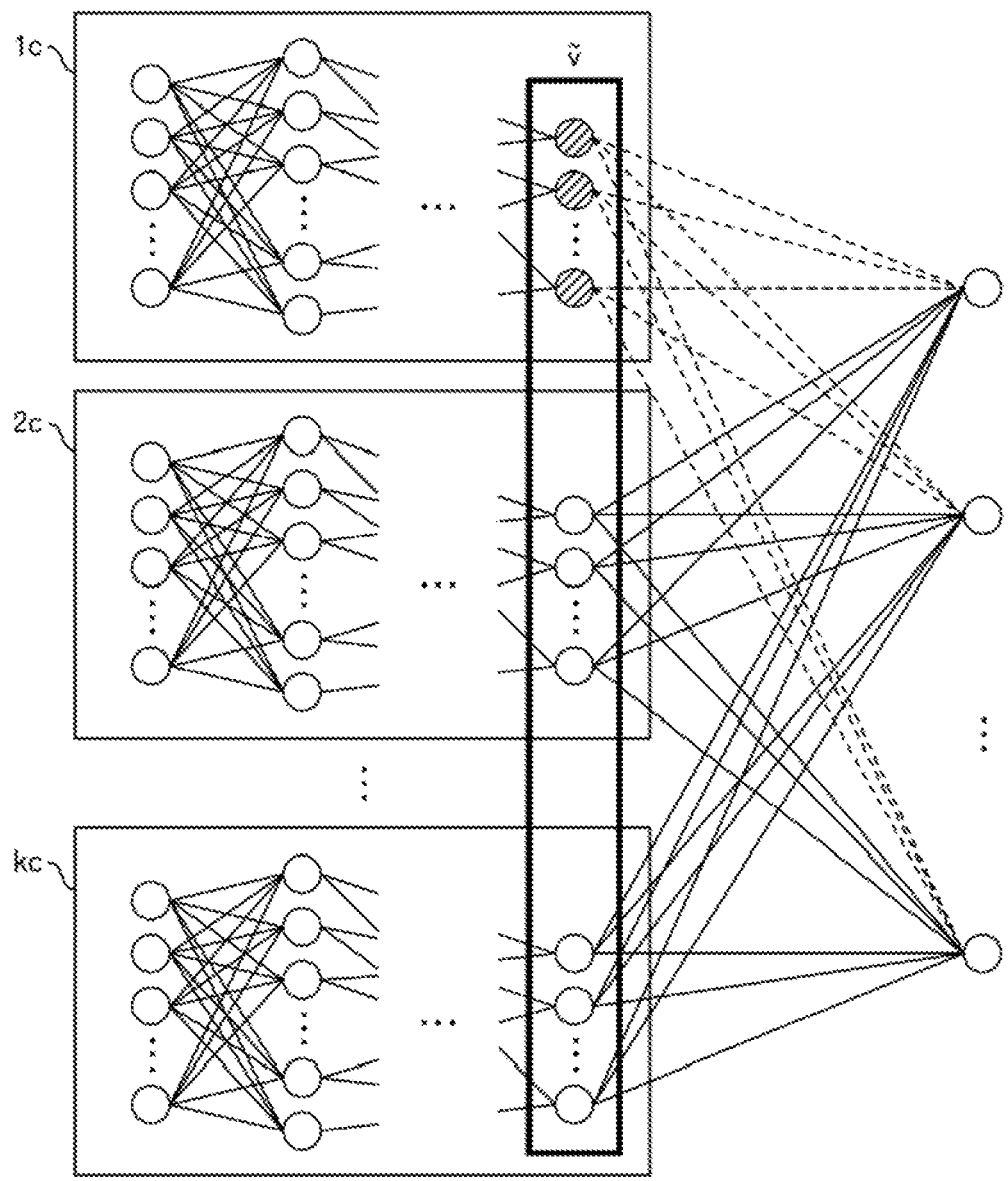
FIG. 23 is a diagram to explain $\tilde{v}$.

Here, v is a vector of the last feature layer when block dropout is not executed, and $\tilde{v}$ is a vector of the last feature layer when block dropout is executed. The vectors v and $\tilde{v}$ will be explained using FIG. 22 and FIG. 23. Here, v is a vector of the last feature layer when block dropout is not executed. Therefore, as illustrated in FIG. 22, values of nodes that are included in an area that is enclosed in bold lines are vectors of the elements. On the other hand, $\tilde{v}$ is a vector of the last feature layer after the block dropout has been executed. Therefore, as illustrated in FIG. 23, values of nodes that are included in an area that is enclosed in bold lines are vectors of elements, however, values of nodes that are included in a channel for which the block dropout has been executed are replaced with 0.

The third learning processing unit 108 calculates errors of the last feature layer of the channel that was specified in step S85 based on the error ΔW of the weight matrix, which was calculated in step S87 (step S89). The processing of step S87 is part of the processing of the typical backpropagation, and a detailed explanation is omitted here.

The third learning processing unit 108 calculates the error ΔW of the weight matrix for each layer of the channel that was specified in step S85 by using a backpropagation that is based on the errors of the last feature layer, which were calculated in step S89 (step S91). The processing of step S91 is also processing of the typical backpropagation, and a detailed explanation is omitted here.

The third learning processing unit 108 updates the weight matrix W by W−ΔW, by using the error ΔW of the weight matrix, which was calculated in steps S87 and S91 (step S93). The third learning processing unit 108 updates the weight matrix W that is stored in the parameter storage unit 104 with the updated weight matrix W. The processing then returns to the processing of step S83. The weight matrix W that connects the last feature layer and the output layer may also be updated in step S89.

On the other hand, when there are no unprocessed channels among the channels for which the block dropout has been executed (step S83: NO route), the processing returns to the processing of the calling source.

Figure 24:
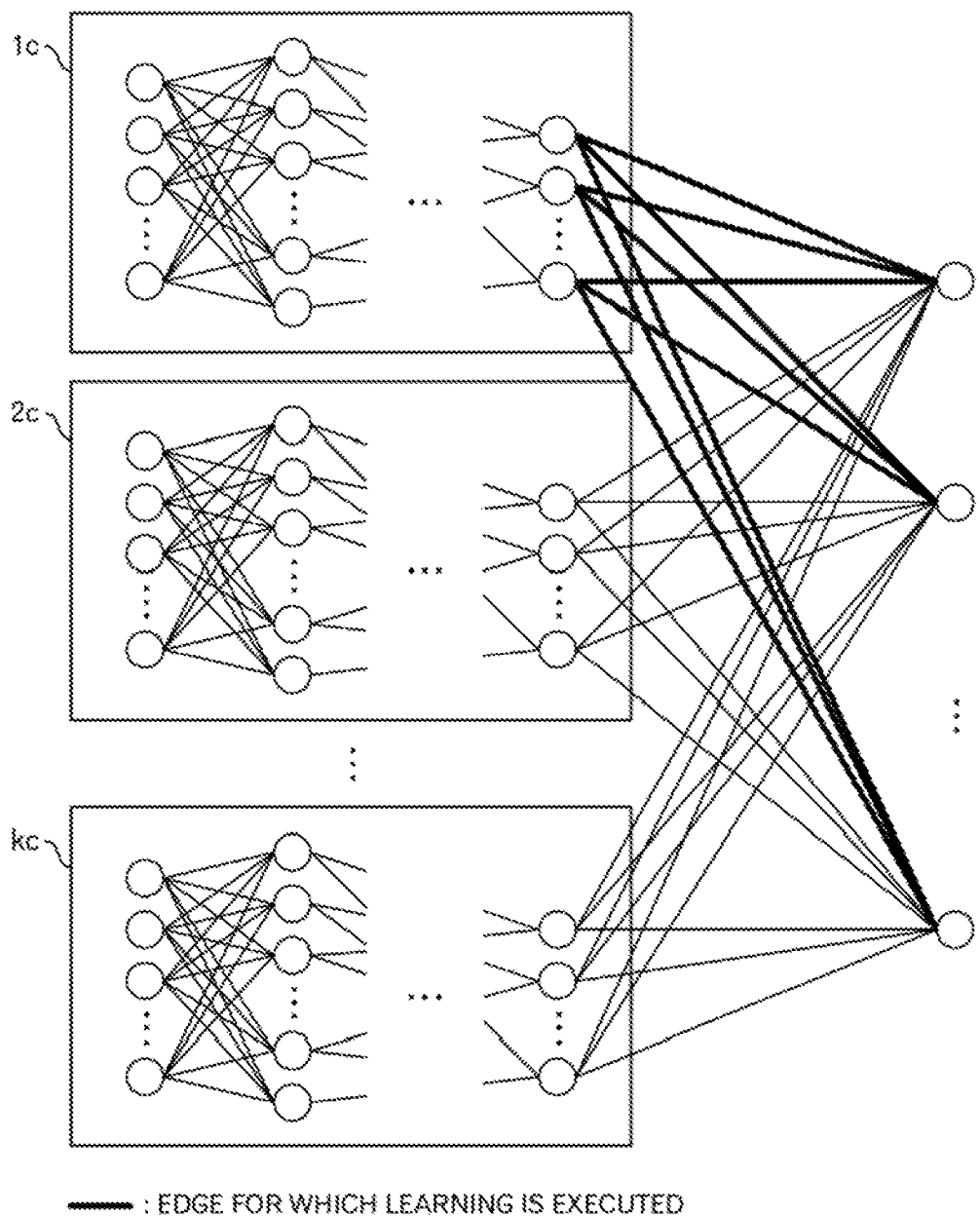
FIG. 24 is a diagram to explain the third learning processing.
Figure 25:
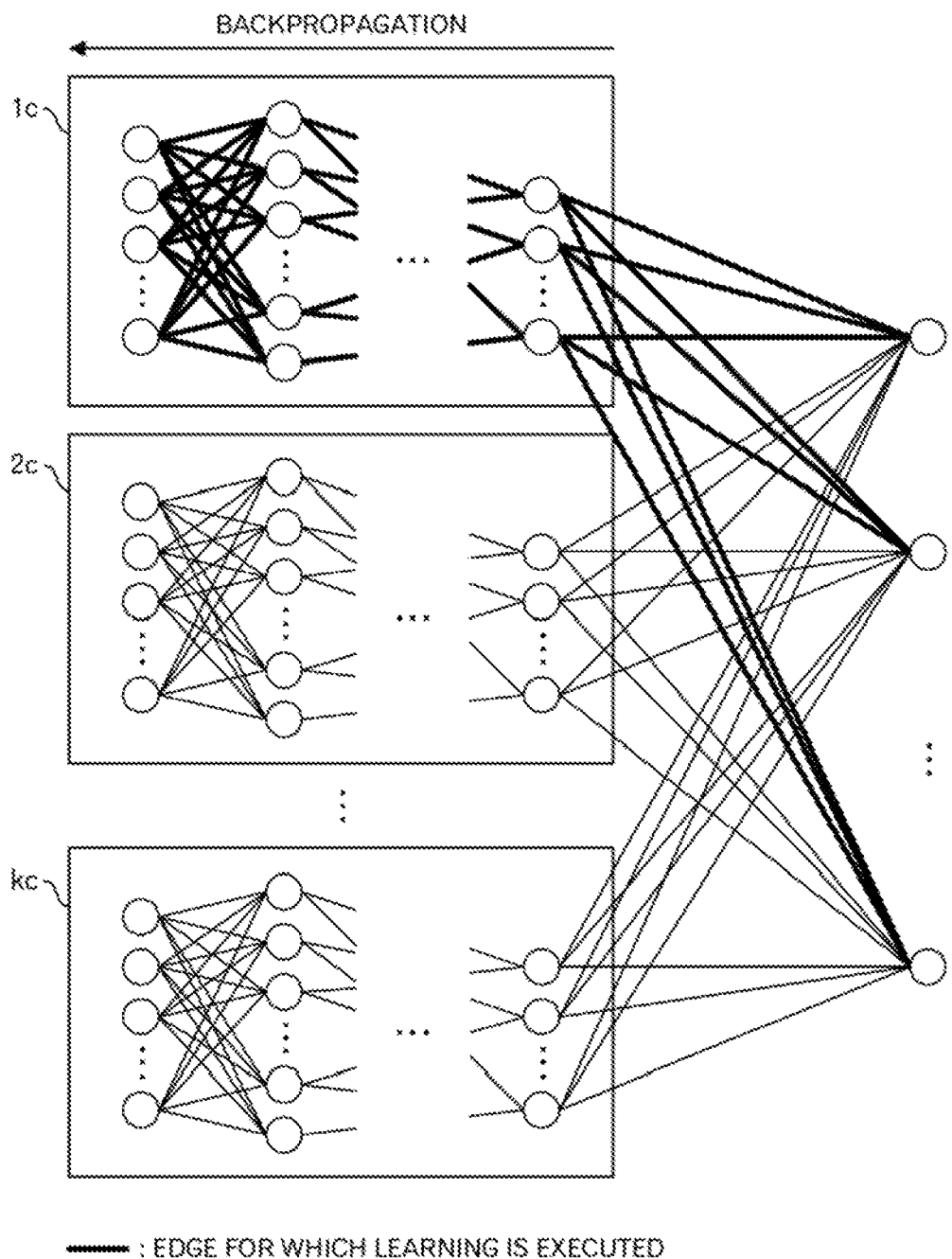
FIG. 25 is a diagram to explain the third learning processing.

An explanation of the third learning processing using FIG. 24 and FIG. 25 is added. In the third learning processing, the error ΔW of the weight matrix that connects the last feature layer for which the block dropout has been executed and the output layer of the channel is calculated using (v−v̂) and Δb. Then, as illustrated in FIG. 24, learning of the weight matrix W that connects the last feature layer and the output layer is performed using the calculated W. Furthermore, the error ΔW of the weight matrix is calculated for each layer of the channel for which the block dropout has been executed by using the backpropagation. As illustrated in FIG. 25, learning of the weight matrix W for each layer of the channel is performed using the calculated ΔW.

As described above, when learning of the channel for which the block dropout has been executed is considered to not be proceeding properly, learning is performed only for the channel for which the block dropout has been executed.

Returning to the explanation of FIG. 10, the calculation unit 105 determines whether the processing is to be ended (step S27). The processing is ended, for example, when there is no unprocessed input data stored in the input data storage unit 101. When the processing is not to be ended (step S27: NO route), the processing returns to step S1 in FIG. 6 by way of terminal B. Otherwise, the processing is ended (step S27: YES route).

The improvement in classification precision will be explained using FIG. 26. FIG. 26 illustrates correct answer rates in the case of actually classifying data using a DNN. In this classification, three kinds of time-series data are used, and the number of layers and the conditions for convolutional layers and pooling layers are the same at each classification opportunity. Conventional block dropout means that parameters of a channel for which block dropout has been executed is not updated. Block dropout in this embodiment means that a channel of which parameters are updated is determined based on a difference between an output error after the block dropout is executed and an output error in the case the block dropout is not executed.

As illustrated in FIG. 26, the correct answer rate is higher when executing the block dropout of this embodiment than when not executing block dropout and when executing conventional block dropout. Moreover, the correct answer rate is higher when back dropout is executed than when the back dropout is not executed. Therefore, by performing learning as in this embodiment, it becomes possible to raise precision of classification using a parallel type DNN.

Embodiment 2

Figure 27:
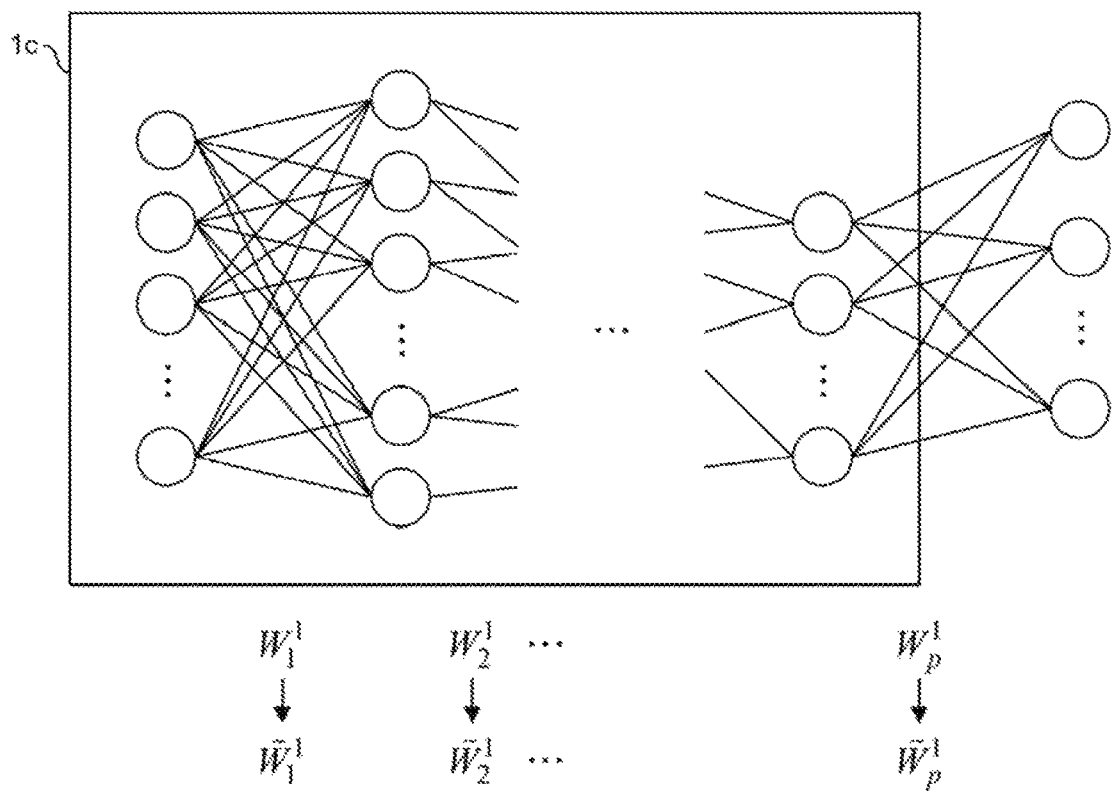
FIG. 27 is a diagram to explain a second embodiment.

In the second learning processing in the first embodiment, values of errors in the output layer were replaced with random values, however, it is also possible to replace other values with random values as well. For example, a weight matrix that connects the pth layer (p is a natural number that is 1 or more) and the (p+1)th layer in channel Ic (I is a natural number that satisfies the relationship 1≤I≤k) is represented as $W^I_p$. In this case, as illustrated in FIG. 27, $W^I_p$ may be replaced with $W^I_p$ tilde, which is a weight matrix in which each of elements of $W^I_p$ are replaced with random values that are in a range of 0 to a pre-determined value. Even in this kind of method, in the same way as in the first embodiment, it becomes possible for learning to proceed for a channel for which block dropout has been executed.

The range of random values may be different for each layer.

Embodiment 3

Figure 28:
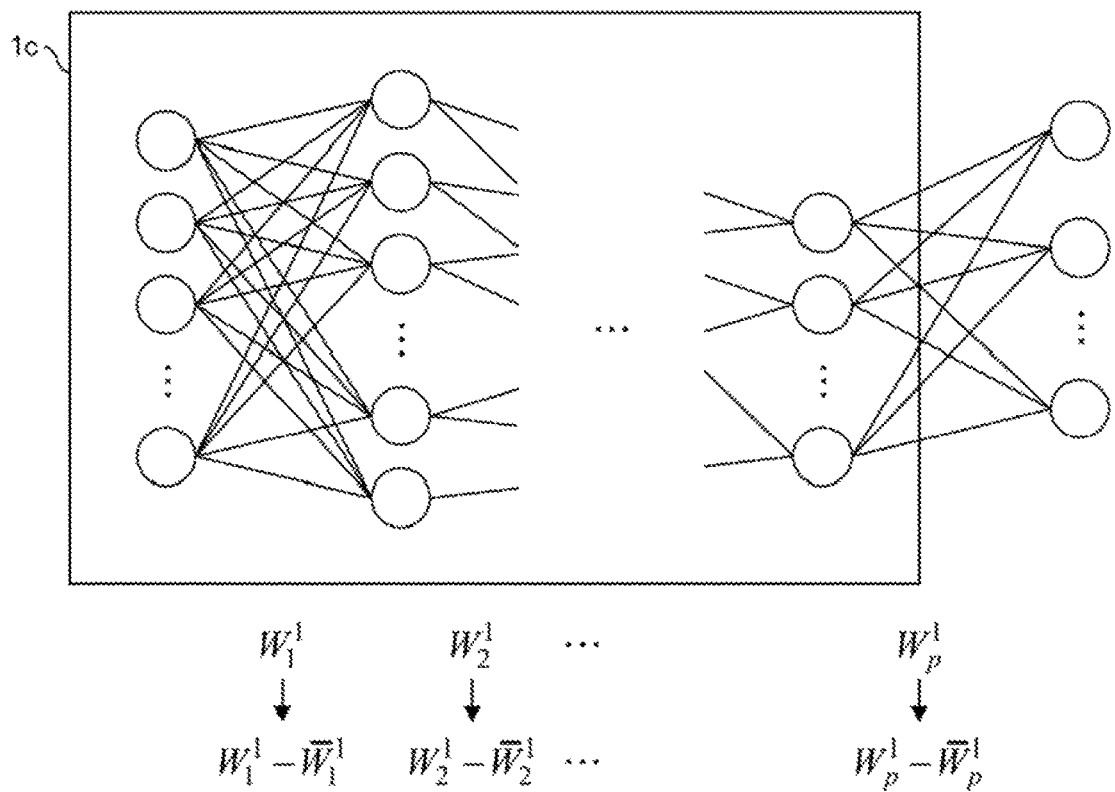
FIG. 28 is a diagram to explain a third embodiment.

In the second learning processing of the second embodiment, the weight matrix $W^I_p$ is replaced with a matrix of random values. However, the error of the weight matrix may also be replaced with a random value matrix. For example, each element of an error matrix $W^I_p$ bar of the weight matrix $W^I_p$ may be replaced with random values in a range from 0 to a pre-determined value. In this case, as illustrated in FIG. 28, $W^I_p$ may be updated by $W^I_p - W^I_p$ bar. Even in the case of this kind of method, in the same way as in the first and second embodiments, it becomes possible for learning to proceed for a channel for which block dropout has been executed.

The range of random values may be different for each layer.

Embodiment 4

Figure 29:
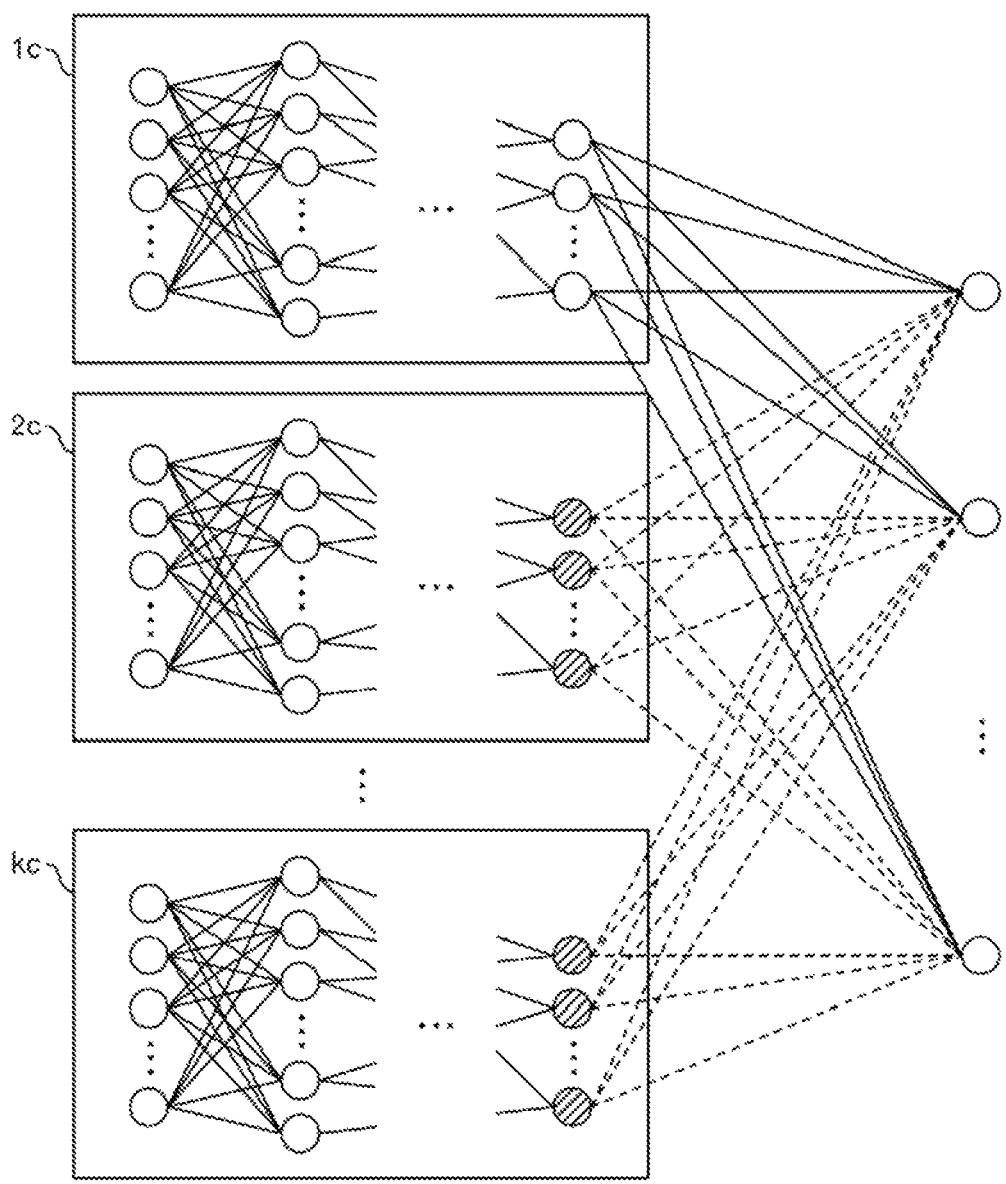
FIG. 29 is a diagram to explain a fourth embodiment.

In the third learning processing in the first embodiment, learning is performed for a channel for which block dropout has been executed (here, this is taken to be channel 1 c), and learning is not performed for channels for which block dropout has not been executed (here, channels 2c to kc). As illustrated in FIG. 29, this is the same as taking the channels 2c to kc to be channels for which block dropout has been executed, and performing as usual learning for channel 1c for which block dropout has not been executed. Therefore, when the relationship $|e_a - e_b| < t$ holds, selection of channels for which block drop out is to be executed may be reversed.

Embodiment 5

In the fourth embodiment, selection of channels for which block dropout is to be executed is reversed when the relationship $|e_a - e_b| < t$ holds, however, it is also possible to shift to processing of the next input data without performing learning at all. As a result, it is possible to prevent learning from being performed for channels for which block dropout has not been executed (here, these are channels 2c to kc).

Although the embodiments of this invention were explained above, this invention is not limited to those. For example, the functional block configuration of the information processing apparatus 1, which is explained above, does not always correspond to actual program module configuration.

Moreover, the aforementioned data configuration is a mere example, and may be changed. Furthermore, as for the processing flow, as long as the processing results do not change, the turns of the steps may be exchanged or the steps may be executed in parallel.

Moreover, the data that is stored in the input data storage unit 101 may not be data such as described above.

Figure 30:
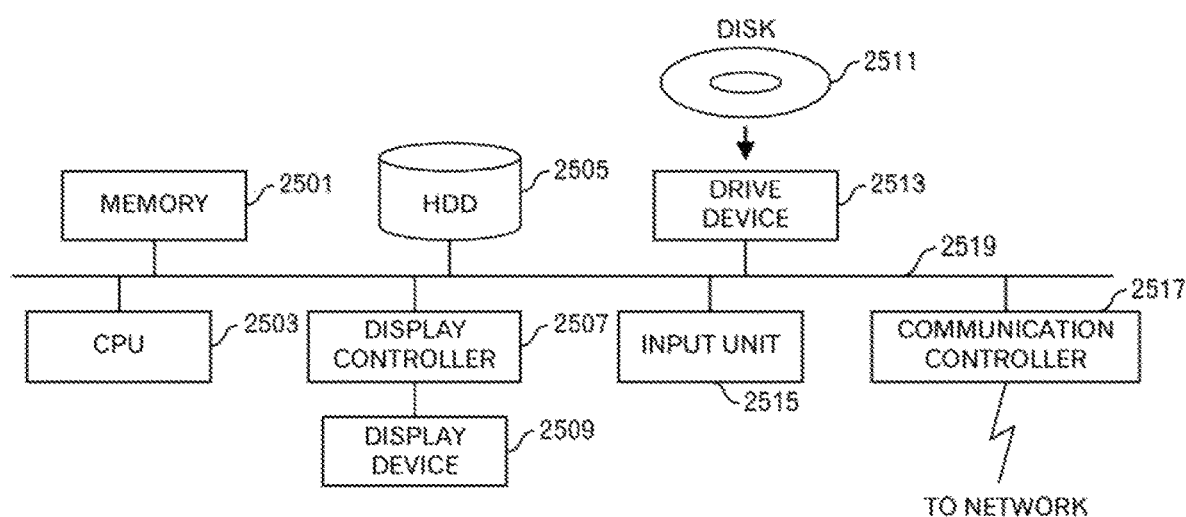
FIG. 30 is a functional block diagram of a computer.

In addition, the aforementioned information processing apparatus 1 is a computer apparatus as illustrated in FIG. 30. That is, a memory 2501, a CPU 2503 (central processing unit), a HDD (hard disk drive) 2505, a display controller 2507 connected to a display device 2509, a drive device 2513 for a removable disk 2511, an input unit 2515, and a communication controller 2517 for connection with a network are connected through a bus 2519 as illustrated in FIG. 30. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In these embodiments of this invention, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer apparatus as stated above, the hardware such as the CPU 2503 and the memory 2501, the OS and the application programs systematically cooperate with each other, so that various functions as described above in details are realized.

The aforementioned embodiments are summarized as follows:

A machine learning method related to these embodiments includes: (A) calculating a first output error between a label and an output in a case where dropout in which values are replaced with 0 is executed for a last layer of a first channel among plural channels in a parallel neural network; (B) calculating a second output error between the label and an output in a case where the dropout is not executed for the last layer of the first channel; and (C) identifying at least one channel from the plural channels based on a difference between the first output error and the second output error to update parameters of the identified channel.

By focusing attention on the difference between the first output error and the second output error, it is possible to determine for which channel the parameter is to be updated. Therefore, by executing processing such as described above, parameters of a suitable channel are updated, and thus it becomes possible to increase classification precision of a parallel neural network.

Moreover, the machine learning method may further include: (D) executing the dropout for at least one of values of an output layer in the parallel neural network. Learning of a channel that does not affect values that were replaced with 0 may be more vigorously performed based on values that are affected by the channel, and it becomes possible to increase precision of classification.

Moreover, the identifying may include: (c1) first updating parameters of a second channel that is a channel other than the first channel, upon detecting that a first value obtained by subtracting the second output error from the first output error is greater than a threshold; (c2) second updating parameters of the first channel and the second channel, upon detecting that an absolute value of the first value is smaller than the threshold; and (c3) third updating parameters of the first channel, upon detecting that a second value obtained by subtracting the first output error from the second output error is greater than the threshold. When the first value obtained by subtracting the second output error from the first output error is greater than a threshold, the error has become larger by performing dropout. Therefore, learning of the first channel is considered to be proceeding properly. On the other hand, when the absolute value of the first value obtained by subtracting the second output error from the first output error is smaller than the threshold, learning of the first channel is not proceeding properly. Therefore, there is a possibility that an effect of dropout has become small. Moreover, when the second value obtained by subtracting the first output error from the second output error is greater than the threshold, the error became smaller by performing dropout. Therefore, learning of the first channel is considered not to be proceeding properly. Therefore, by performing processing as described above, parameters of a suitable channel is updated.

Moreover, the second updating may include: (c211) calculating a first error that is an error of a parameter for calculating values of an output layer from values of the last layer of the first channel and values of a last layer of the second channel, from the first output error, the values of the last layer of the first channel and the values of the last layer of the second channel; (c212) updating, based on the first error, parameters of the second channel by backpropagation; (c213) calculating a second error that is an error of a parameter for calculating values of the output layer from the values of the last layer of the first channel and the values of the last layer of the second channel, from random values in a range calculated by a predetermined method, the values of the last layer of the first channel and the values of the last layer of the second channel; and (c214) updating, based on the second error, parameters of the first channel by the backpropagation. As a result, it becomes possible for learning for the second channel to proceed by a normal method, and it also becomes possible for learning for the first channel to proceed.

Moreover, the second updating may include: (c221) calculating a first error that is an error of a parameter for calculating values of an output layer from values of the last layer of the first channel and values of a last layer of the second channel, from the first output error, the values of the last layer of the first channel and the values of the last layer of the second channel; (c222) updating, based on the first error, parameters of the second channel by backpropagation; and (c223) replacing parameters of the first channel and a parameter for calculating the values of the output layer from the values of the last layer of the first channel with random values. As a result, it becomes possible for learning for the second channel to proceed by a normal method, and it also becomes possible for learning for the first channel to proceed.

Moreover, the second updating may include: (c231) calculating a first error that is an error of a parameter for calculating values of an output layer from values of the last layer of the first channel and values of a last layer of the second channel, from the first output error, the values of the last layer of the first channel and the values of the last layer of the second channel; (c232) updating, based on the first error, parameters of the second channel by backpropagation; (c233) replacing an error of a parameter for calculating the values of the output layer from the values of the last layer of the first channel and errors of parameters of the first channel with random values; and (c234) updating the parameter for calculating the values of the output layer from the values of the last layer of the first channel and the parameters of the first channel, by using the replaced error of parameters for calculating the values of the output layer from the values of the last layer of the first channel and the replaced errors of parameters of the first channel. As a result, it becomes possible for learning for the second channel to proceed by a normal method, and it also becomes possible for learning for the first channel to proceed.

Moreover, the third updating may include: (c311) calculating a first error of a parameter for calculating values of an output layer from values of the last layer of the first channel and values of a last layer of the second channel for which the dropout has been executed, from the second output error, the values of the last layer of the first channel and the values of the last layer of the second channel; and (c312) updating, based on the first error, parameters of the first channel by backpropagation. As a result, it becomes possible for learning of the first channel to proceed, it also becomes possible to prevent learning of the second channel from being performed.

Moreover, the third updating may include: (c321) keeping parameters of the first channel unchanged, and the process may further include: (E) calculating an output in a case where the dropout is not executed for the last layer of the first channel and the dropout is executed for a last layer of a second channel. As a result, after exchanging the channel for which the dropout is to executed, it becomes possible for learning to proceed.

Moreover, the third updating may include: (c321) keeping parameters of the first channel unchanged, and the process further comprising: (c322) starting processing for a next input. As a result, it becomes possible to start processing of the next input without performing learning of any channels.

Moreover, the first updating may include: (c111) calculating a first error that is an error of a parameter for calculating values of an output layer from values of the last layer of the first channel and values of a last layer of the second channel from the first output error, the values of the last layer of the first channel and the values of the last layer of the second channel; and (c112) updating, based on the first error, parameters of the second channel by backpropagation. As a result, it becomes possible for learning of the second channel to proceed by a normal method.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    calculating a first output error between a label and an output in a case where dropout in which values are replaced with 0 is executed for a last layer of a first channel among a plurality of channels in a parallel neural network;
    calculating a second output error between the label and an output in a case where the dropout is not executed for the last layer of the first channel; and
    identifying at least one channel from the plurality of channels based on a difference between the first output error and the second output error to update parameters of the identified channel.

2. The non-transitory computer-readable storage medium as set forth in claim 1, further comprising:
    executing the dropout for at least one of values of an output layer in the parallel neural network.

3. The non-transitory computer-readable storage medium as set forth in claim 1, wherein the identifying comprises:
    first updating parameters of a second channel that is a channel other than the first channel, upon detecting that a first value obtained by subtracting the second output error from the first output error is greater than a threshold;
    second updating parameters of the first channel and the second channel, upon detecting that an absolute value of the first value is smaller than the threshold; and
    third updating parameters of the first channel, upon detecting that a second value obtained by subtracting the first output error from the second output error is greater than the threshold.

4. The non-transitory computer-readable storage medium as set forth in claim 3, wherein the second updating comprises:
    calculating a first error that is an error of a parameter for calculating values of an output layer from values of the last layer of the first channel and values of a last layer of the second channel, from the first output error, the values of the last layer of the first channel and the values of the last layer of the second channel;
    updating, based on the first error, parameters of the second channel by backpropagation;
    calculating a second error that is an error of a parameter for calculating values of the output layer from the values of the last layer of the first channel and the values of the last layer of the second channel, from random values in a range calculated by a predetermined method, the values of the last layer of the first channel and the values of the last layer of the second channel; and
    updating, based on the second error, parameters of the first channel by the backpropagation.

5. The non-transitory computer-readable storage medium as set forth in claim 3, wherein the second updating comprises:
    calculating a first error that is an error of a parameter for calculating values of an output layer from values of the last layer of the first channel and values of a last layer of the second channel, from the first output error, the values of the last layer of the first channel and the values of the last layer of the second channel;
    updating, based on the first error, parameters of the second channel by backpropagation; and
    replacing parameters of the first channel and a parameter for calculating the values of the output layer from the values of the last layer of the first channel with random values.

6. The non-transitory computer-readable storage medium as set forth in claim 3, wherein the second updating comprises:
    calculating a first error that is an error of a parameter for calculating values of an output layer from values of the last layer of the first channel and values of a last layer of the second channel, from the first output error, the values of the last layer of the first channel and the values of the last layer of the second channel;

updating, based on the first error, parameters of the second channel by backpropagation;

replacing an error of a parameter for calculating the values of the output layer from the values of the last layer of the first channel and errors of parameters of the first channel with random values; and updating the parameter for calculating the values of the output layer from the values of the last layer of the first channel and the parameters of the first channel, by using the replaced error of parameters for calculating the values of the output layer from the values of the last layer of the first channel and the replaced errors of parameters of the first channel.

7. The non-transitory computer-readable storage medium as set forth in claim 3, wherein the third updating comprises:

calculating a first error of a parameter for calculating values of an output layer from values of the last layer of the first channel and values of a last layer of the second channel for which the dropout has been executed, from the second output error, the values of the last layer of the first channel and the values of the last layer of the second channel; and updating, based on the first error, parameters of the first channel by backpropagation.

8. The non-transitory computer-readable storage medium as set forth in claim 3, wherein the third updating comprises:

keeping parameters of the first channel unchanged, and the process further comprising:

calculating an output in a case where the dropout is not executed for the last layer of the first channel and the dropout is executed for a last layer of a second channel.

9. The non-transitory computer-readable storage medium as set forth in claim 3, wherein the third updating comprises:

keeping parameters of the first channel unchanged, and the process further comprising:

starting processing for a next input.

10. The non-transitory computer-readable storage medium as set forth in claim 3, wherein the first updating comprises:

calculating a first error that is an error of a parameter for calculating values of an output layer from values of the last layer of the first channel and values of a last layer of the second channel from the first output error, the values of the last layer of the first channel and the values of the last layer of the second channel; and updating, based on the first error, parameters of the second channel by backpropagation.

11. A machine learning method, comprising:

calculating, by using a computer, a first output error between a label and an output in a case where dropout in which values are replaced with 0 is executed for a last layer of a first channel among a plurality of channels in a parallel neural network;

calculating, by using the computer, a second output error between the label and an output in a case where the dropout is not executed for the last layer of the first channel; and identifying, by using the computer, at least one channel from the plurality of channels based on a difference between the first output error and the second output error to update parameters of the identified channel.

12. An information processing apparatus, comprising:

a memory; and a processor coupled to the memory and configured to:

calculate a first output error between a label and an output in a case where dropout in which values are replaced with 0 is executed for a last layer of a first channel among a plurality of channels in a parallel neural network;

calculate a second output error between the label and an output in a case where the dropout is not executed for the last layer of the first channel; and identify at least one channel from the plurality of channels based on a difference between the first output error and the second output error to update parameters of the identified channel.

* * * * *